US009542894B2

(12) United States Patent
Ohno et al.

(10) Patent No.: US 9,542,894 B2
(45) Date of Patent: Jan. 10, 2017

(54) DISPLAY APPARATUS AND CONTROL METHOD THEREOF

(71) Applicant: CANON KABUSHIKI KAISHA, Tokyo (JP)

(72) Inventors: Tomoyuki Ohno, Zama (JP); Atsushi Morita, Yokohama (JP); Masaki Akamatsu, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 14/035,044

(22) Filed: Sep. 24, 2013

(65) Prior Publication Data
US 2014/0085360 A1    Mar. 27, 2014

(30) Foreign Application Priority Data

Sep. 26, 2012 (JP) ................................. 2012-212399
Jul. 29, 2013 (JP) ................................. 2013-156709

(51) Int. Cl.
*H04N 5/45* (2011.01)
*G09G 3/34* (2006.01)
(Continued)

(52) U.S. Cl.
CPC .............. *G09G 3/3426* (2013.01); *G09G 3/36* (2013.01); *G09G 3/3648* (2013.01); *G09G 5/14* (2013.01); *H04N 5/445* (2013.01); *G09G 2320/0233* (2013.01); *G09G 2320/0242* (2013.01); *G09G 2320/0252* (2013.01); *G09G 2320/0261* (2013.01); *G09G 2320/064* (2013.01); *G09G 2320/0646* (2013.01);
(Continued)

(58) Field of Classification Search
CPC .. H04N 21/4221; H04N 21/4316; H04N 5/45; H04N 5/445; G09G 3/3426; G09G 2320/0686; G09G 2320/0646; G09G 3/3648; G09G 2320/0242; G09G 2320/0252
See application file for complete search history.

(56) References Cited

U.S. PATENT DOCUMENTS 7,928,957 B2    4/2011   Tsuchida et al.
8,232,956 B2    7/2012   Fujine et al.
(Continued)

FOREIGN PATENT DOCUMENTS

JP    2002-099250 A    4/2002
JP    2007-140483 A    6/2007
(Continued)

*Primary Examiner* — Michael J Eurice
(74) *Attorney, Agent, or Firm* — Fitzpatrick, Cella, Harper & Scinto

(57) ABSTRACT

A display apparatus includes: a display unit configured to display an image; a light emission unit configured to individually control light emission for each of a plurality of divided regions; an acquisition unit configured to acquire, for each divided region, a characteristic value of the image displayed on each of the divided regions; and a control unit. The control unit controls light emission of the light emission unit such that: in a moving image region, in which only a moving image is displayed, among the plurality of divided regions, light is emitted at a brightness based on a characteristic value of the moving image region; and in a mixed region, in which both of the moving image and a still image are displayed, among the plurality of divided regions, light is emitted at predetermined brightness.

14 Claims, 29 Drawing Sheets

(51) Int. Cl.
*G09G 3/36* (2006.01)
*H04N 5/445* (2011.01)
*G09G 5/14* (2006.01)
*H04N 21/431* (2011.01)
*H04N 21/422* (2011.01)

(52) U.S. Cl.
CPC . *G09G 2320/0686* (2013.01); *G09G 2360/16* (2013.01); *H04N 5/45* (2013.01); *H04N 21/4221* (2013.01); *H04N 21/4316* (2013.01)

(56) References Cited

U.S. PATENT DOCUMENTS

| | | | | |
|---|---|---|---|---|
| 2001/0033260 | A1* | 10/2001 | Nishitani | G09G 3/3406 345/87 |
| 2002/0050987 | A1* | 5/2002 | Sakashita | G09G 3/3406 345/204 |
| 2002/0078447 | A1* | 6/2002 | Mizutome | H04N 5/4401 725/37 |
| 2004/0061805 | A1* | 4/2004 | Shibamiya | H04N 21/234363 348/565 |
| 2004/0113906 | A1* | 6/2004 | Lew | G09G 3/3406 345/211 |
| 2004/0261103 | A1* | 12/2004 | Ohno | H04N 1/00384 725/38 |
| 2005/0184952 | A1* | 8/2005 | Konno | G09G 3/3426 345/102 |
| 2006/0120082 | A1* | 6/2006 | Choo | G02F 1/133603 362/276 |
| 2006/0208999 | A1* | 9/2006 | Lee | G09G 3/3426 345/102 |
| 2007/0030697 | A1* | 2/2007 | Kim | G09G 3/342 362/618 |
| 2008/0018571 | A1* | 1/2008 | Feng | G09G 3/3648 345/87 |
| 2008/0129877 | A1* | 6/2008 | Ohno | H04N 5/45 348/720 |
| 2008/0297464 | A1 | 12/2008 | Ito | |
| 2009/0140665 | A1* | 6/2009 | Park | G09G 3/3426 315/291 |
| 2009/0146941 | A1* | 6/2009 | Fujine | G09G 3/3406 345/102 |
| 2009/0174638 | A1* | 7/2009 | Brown Elliott | G02F 1/133621 345/88 |
| 2009/0184917 | A1* | 7/2009 | Park | G09G 3/3426 345/102 |
| 2009/0268105 | A1 | 10/2009 | Kohashikawa et al. | |
| 2009/0290091 | A1* | 11/2009 | Tsuchida | G09G 3/3426 349/61 |
| 2009/0295706 | A1* | 12/2009 | Feng | G09G 3/342 345/102 |
| 2010/0134512 | A1* | 6/2010 | Kwon | G09G 3/3413 345/589 |
| 2010/0134535 | A1* | 6/2010 | Shidara | G09G 3/20 345/690 |
| 2010/0265275 | A1* | 10/2010 | Pijlman | G02F 1/133611 345/690 |
| 2011/0134324 | A1* | 6/2011 | Ichioka | H04N 5/445 348/564 |
| 2011/0141002 | A1* | 6/2011 | Kim | G09G 3/342 345/102 |
| 2011/0149180 | A1* | 6/2011 | Ichioka | G09G 3/3611 348/836 |
| 2011/0157471 | A1* | 6/2011 | Seshadri | G06F 3/14 348/564 |
| 2011/0157489 | A1* | 6/2011 | Ichioka | G09G 3/3426 348/790 |
| 2012/0086713 | A1* | 4/2012 | Cho | G09G 3/003 345/419 |
| 2012/0086740 | A1* | 4/2012 | Murai | G09G 3/3406 345/690 |
| 2012/0113164 | A1* | 5/2012 | Furukawa | G09G 3/3426 345/690 |
| 2012/0133685 | A1* | 5/2012 | Cho | G09G 3/3426 345/690 |
| 2012/0154466 | A1* | 6/2012 | Kitada | G09G 3/3426 345/694 |
| 2013/0307835 | A1* | 11/2013 | Wu | G09G 3/3611 345/212 |

FOREIGN PATENT DOCUMENTS

| | | |
|---|---|---|
| JP | 2007-241251 | 9/2007 |
| JP | 2008-299145 | 12/2008 |
| JP | 2009-282451 A | 12/2009 |

* cited by examiner

← COLMN NUMBER OF DIVIDED REGION

| | 1 | 2 | 3 | 4 | 5 | ... | 27 | 28 | 29 | 30 | 31 | 32 |
|---|---|---|---|---|---|---|---|---|---|---|---|---|
| 1 | 1999 | 1996 | 1998 | 2000 | 2002 | ... | 2001 | 1999 | 1989 | 2000 | 1980 | 1999 |
| 2 | 1980 | 1995 | 2001 | 1999 | 2003 | ... | 1985 | 1994 | 1996 | 2002 | 1993 | 1992 |
| 3 | 1999 | 1998 | 2005 | 2003 | 2000 | ... | 2001 | 1998 | 2000 | 1995 | 2006 | 2004 |
| ... | ... | ... | ... | ... | ... | ... | ... | ... | ... | ... | ... | ... |
| 18 | 2003 | 2000 | 2002 | 1999 | 2001 | ... | 2000 | 2004 | 2001 | 1998 | 1995 | 1998 |
| 19 | 1989 | 1999 | 2003 | 2001 | 2000 | ... | 1998 | 2002 | 1989 | 2000 | 1998 | 2002 |
| 20 | 2002 | 2001 | 2000 | 1998 | 2002 | ... | 2001 | 2000 | 2002 | 1999 | 1999 | 2003 |

↑ ROW NUMBER OF DIVIDED REGION

← BL LIGHT EMISSION DATA OF DIVIDED REGION OF 19TH ROW AND 32ND COLMN

FIG. 4B

| | 1 | 2 | 3 | 4 | 5 | ... | 27 | 28 | 29 | 30 | 31 | 32 |
|---|---|---|---|---|---|---|---|---|---|---|---|---|
| 1 | 2999 | 2994 | 2997 | 3000 | 3003 | ... | 3002 | 2999 | 2984 | 3000 | 2970 | 2999 |
| 2 | 2970 | 2993 | 3002 | 2999 | 3005 | ... | 2978 | 2991 | 2994 | 3003 | 2990 | 2988 |
| 3 | 2999 | 2997 | 3008 | 3005 | 3000 | ... | 3002 | 2997 | 3000 | 2993 | 3009 | 3006 |
| ... | ... | ... | ... | ... | ... | ... | ... | ... | ... | ... | ... | ... |
| 18 | 3005 | 3000 | 3003 | 2999 | 3002 | ... | 3000 | 3006 | 3002 | 2997 | 2993 | 2997 |
| 19 | 2984 | 2999 | 3005 | 3002 | 3000 | ... | 2997 | 3003 | 2984 | 3000 | 2997 | 3003 |
| 20 | 3003 | 3002 | 3000 | 2997 | 3003 | ... | 3002 | 3000 | 3003 | 2999 | 2999 | 3005 |

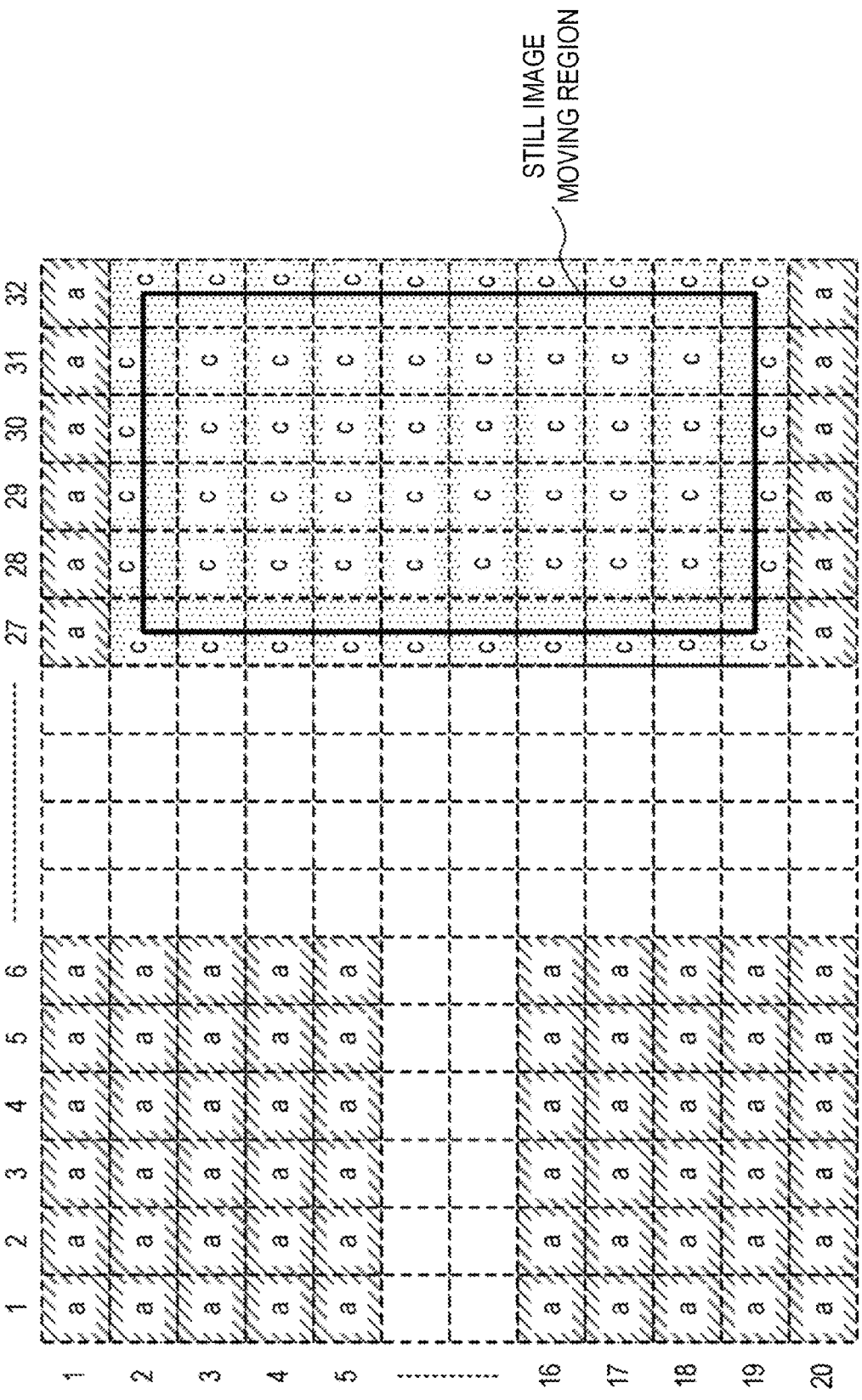

FIG. 24A

| (0,5) | (1,5) | (2,5) | (3,5) |
| (0,4) | (1,4) | (2,4) | (3,4) |
| (0,3) | (1,3) | (2,3) | (3,3) |
| (0,2) | (1,2) | (2,2) | (3,2) |
| (0,1) | (1,1) | (2,1) | (3,1) |
| (0,0) | (1,0) | (2,0) | (3,0) |

MAIN DISPLAY REGION

FIG. 24B

| (0,5) | (1,5) | (2,5) | (3,5) |
| (0,4) | (1,4) | (2,4) | (3,4) |
| (0,3) | (1,3) | (2,3) | (3,3) |
| (0,2) | (1,2) | (2,2) | (3,2) |
| (0,1) | (1,1) | (2,1) | (3,1) |
| (0,0) | (1,0) | (2,0) | (3,0) |

MAIN DISPLAY REGION

SUB DISPLAY REGION

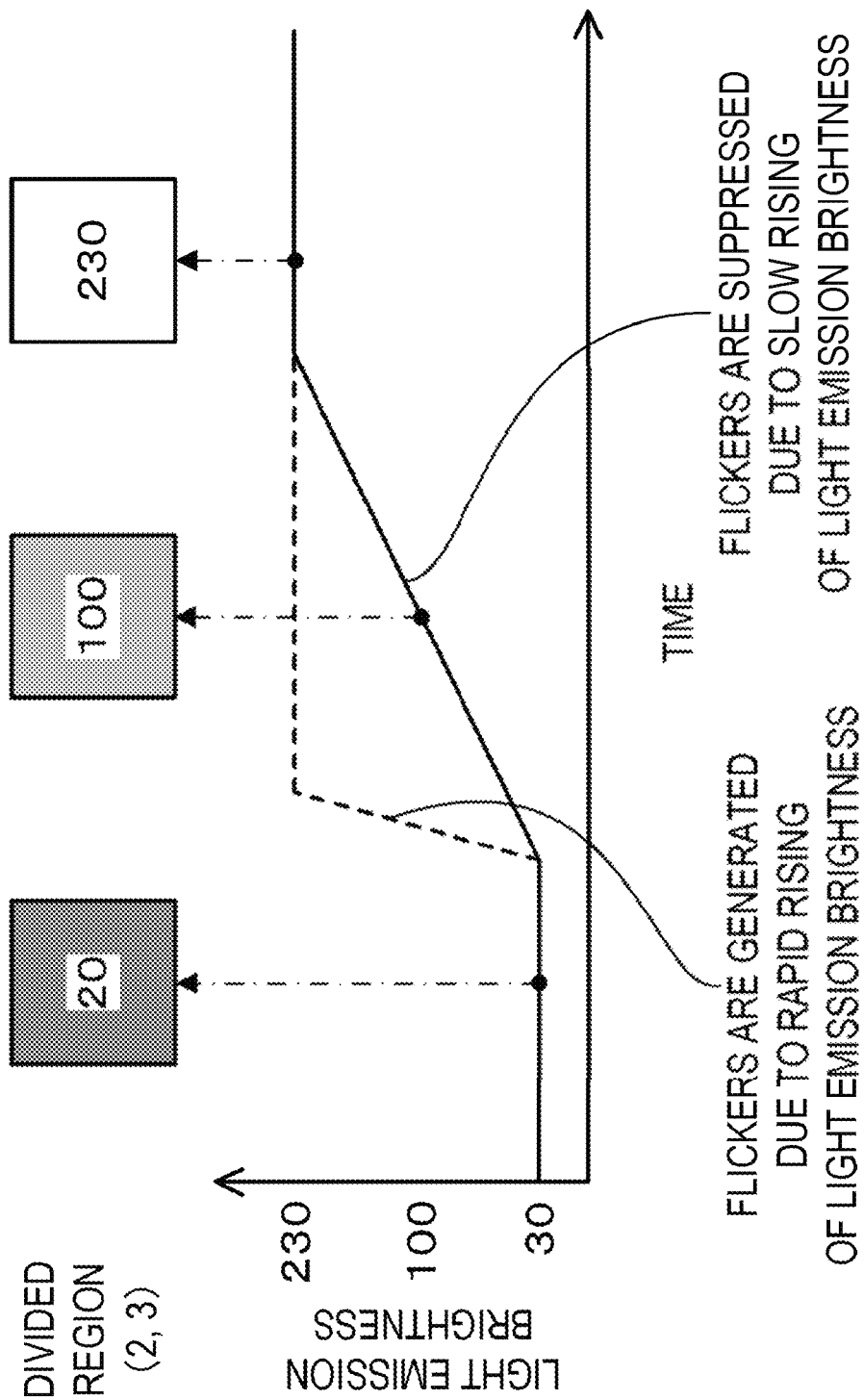

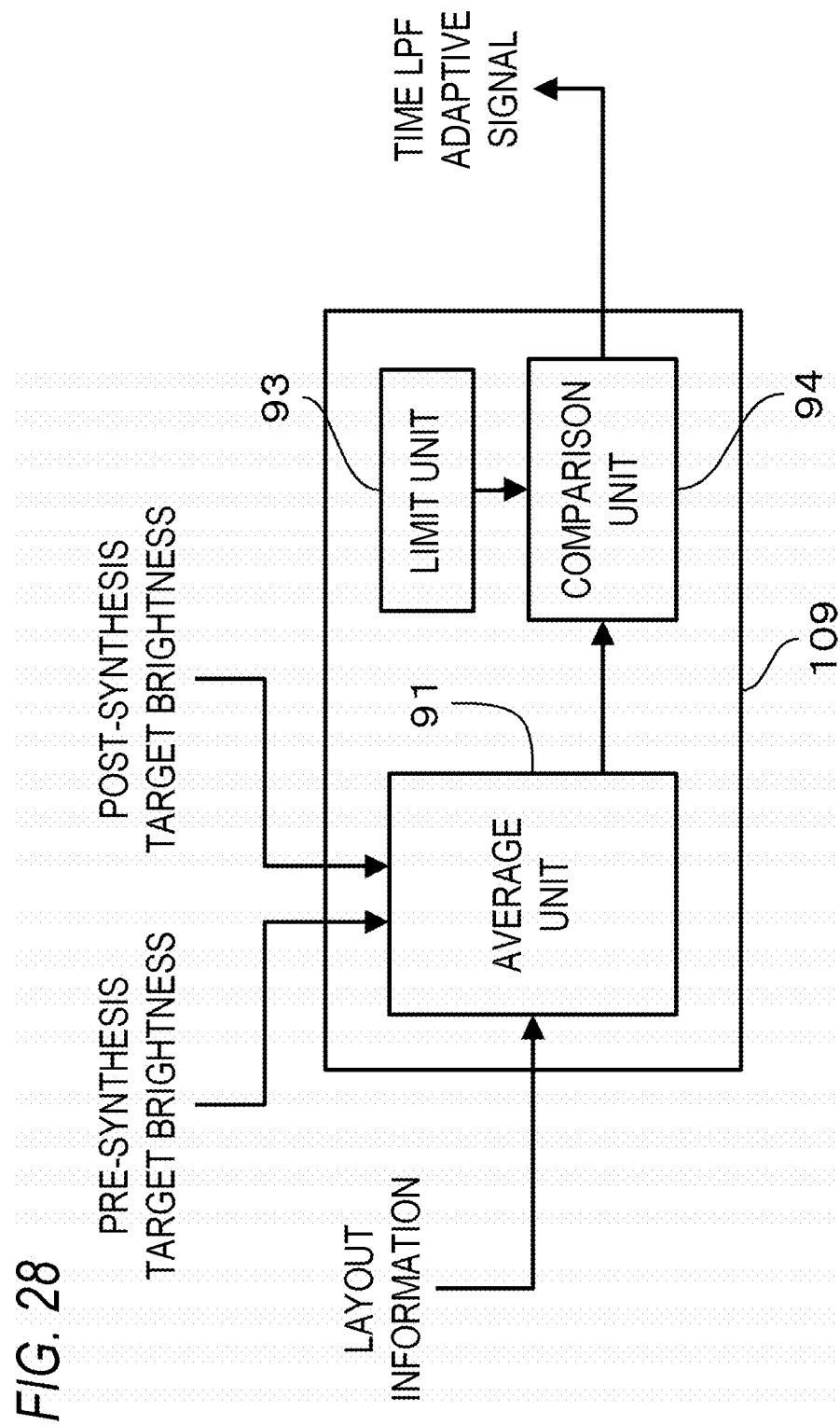

DISPLAY APPARATUS AND CONTROL METHOD THEREOF

BACKGROUND OF THE INVENTION

1. Field of the Invention

The present invention relates to a display apparatus and a control method thereof.

2. Description of the Related Art

One function of a display apparatus is the function of displaying a plurality of images together. The function of displaying the plurality of images is, for example, a function of displaying a plurality of images in a display mode such as PinP (picture-in-picture) display or PoutP (picture-out-picture) display. In the PinP display, a single image is displayed, and at least one image is displayed on the single image. In the PoutP display, a plurality of images are displayed so as not to overlap each other.

Recently, market demands for improvement of display characteristics of display apparatuses have been increasing. As a technology for improving the display characteristics of liquid crystal display apparatuses, there is a technology of controlling the light emission brightness of a backlight on the basis of the characteristic value of an image (e.g., average brightness level (APL)) (Japanese Patent Application Laid-open No. 2007-140483).

Additionally, as the technology for improving display characteristics of liquid crystal display apparatuses, there is a technology of performing local dimming control of a backlight (Japanese Patent Application Laid-open No. 2002-99250). In local dimming control, the light emission brightness of the backlight is controlled per divided region obtained by dividing a screen. With reference to FIG. 13, the local dimming control will be described. As light sources of the backlight, light emitting diodes (LEDs) having better light emission efficiency than cold-cathode fluorescent tubes have started to become mainstream. A backlight in FIG. 13 has LEDs as the light sources. In the example of FIG. 13, the backlight is configured from 60 LED control regions corresponding to 60 divided regions of 10 in the horizontal direction×6 in the vertical direction. Light sources (four LEDs in the example of FIG. 13) are provided in each divided region (each LED control region). The light sources in each divided region can be individually controlled. The light emission brightness of the divided region (light emission brightness of the backlight) where a dark image is displayed is made lower than the light emission brightness of the divided region where a bright image is displayed, thereby enabling an improvement of the contrast of a displayed image (image displayed on a screen).

Generally, the number of the divided regions is smaller than the number of pixels of a display panel (liquid crystal panel). That is, a single divided region is a region including a plurality of pixels. The number of pixels of the liquid crystal panel, which are used in the liquid crystal display apparatus, tends to increase year after year, and about 2 million pixels (e.g., 1920 pixels in the horizontal direction× 1080 pixels in the vertical direction) has become mainstream.

However, when the aforementioned local dimming control is performed at the time of display of a moving image together with a still image, the visibility of the still image is sometimes lowered (image quality of the still image deteriorates). For example, at the time of displaying of the still image and the moving image in a PinP mode, when the aforementioned local dimming control is performed, the light emission brightness of the divided regions where at least a part of the moving image is displayed is changed due to a brightness change of the moving image, as shown in FIG. 14. As a result, flickering in brightness, halation, or the like, is generated in a peripheral region 1601 of the moving image in the still image. Also, in a case where the display position of the still image is changed when the local dimming control is performed and a plurality of still images are displayed together, the visibility of the still image is reduced. For example, in a case where two still images (a still image a, and a still image b) are displayed in a PoutP mode as shown in FIG. 15A, when the display position of the still image b is changed as shown in FIG. 15B, flickering in brightness, halation, or the like is generated in a peripheral region 1501 before and after the change of the display position of the still image b.

SUMMARY OF THE INVENTION

The present invention provides a technology capable of suppressing a reduction in the visibility of a still image due to local dimming control.

The present invention according to its first aspect provides a display apparatus comprising: a display unit configured to display an image on a screen; a light emission unit configured to be capable of individually controlling the light emission for each of a plurality of divided regions that configure the screen; an acquisition unit configured to acquire, for each divided region, a characteristic value of the image displayed on each of the divided regions; and a control unit configured to control the light emission of the light emission unit. The control unit controls the light emission of the light emission unit such that: in a moving image region, in which only a moving image is displayed, among the plurality of divided regions, light is emitted at a brightness based on a characteristic value of the moving image region; and in a mixed region, in which both of the moving image and a still image are displayed, among the plurality of divided regions, light is emitted at a predetermined brightness. The present invention according to its second aspect provides a display apparatus comprising: a display unit configured to display an image on a screen; a light emission unit configured to be capable of individually controlling the light emission for each of a plurality of divided regions that configure the screen; an acquisition unit configured to acquire, for each divided region, a characteristic value of the image displayed on each of the divided regions; and a control unit configured to control the light emission of the light emission unit. The control unit controls the light emission of the light emission unit such that: in a divided region, in which the distance from a still image region, which is a divided region displaying only a still image, is at least a predetermined value, among a plurality of divided regions in which a moving image is displayed, light is emitted at a brightness based on a characteristic value of the divided region; and in a divided region, in which the distance from the still image region is not more than the predetermined value, among the plurality of divided regions in which the moving image is displayed, light is emitted at the predetermined brightness.

The present invention according to its third aspect provides a method of controlling a display apparatus having a display unit configured to display an image on a screen and a light emission unit configured to be capable of individually controlling light emission for each of a plurality of divided regions that configures the screen. The method comprises the steps of: acquiring, for each divided region, a characteristic value of the image displayed on each of the divided regions; and controlling the light emission of the light emission unit. In the controlling step, the light emission of the light emission unit is controlled such that: in a moving image region, in which only a moving image is displayed, among the plurality of divided regions, light is emitted at a brightness based on a characteristic value of the moving image region; and in a mixed region, in which both of the moving image and a still image are displayed, among the plurality of divided regions, light is emitted at a predetermined brightness. The present invention according to its fourth aspect provides a method of controlling a display apparatus having a display unit configured to display an image on a screen and a light emission unit configured to be capable of individually controlling light emission for each of a plurality of divided regions that configures the screen. The method comprises the steps of: acquiring, for each divided region, a characteristic value of the image displayed on each of the divided regions; and controlling the light emission of the light emission unit. In the controlling step, the light emission of the light emission unit is controlled such that: in a divided region, in which the distance from a still image region, which is a divided region displaying only a still image, is at least a predetermined value, among a plurality of divided regions in which a moving image is displayed, light is emitted at a brightness based on a characteristic value of the divided region; and in a divided region, in which the distance from the still image region is less than the predetermined value, among the plurality of divided regions in which the moving image is displayed, light is emitted at the predetermined brightness.

According to the present invention, reduction in visibility of a still image due to local dimming control can be suppressed.

Further features of the present invention will become apparent from the following description of exemplary embodiments with reference to the attached drawings.

BRIEF DESCRIPTION OF THE DRAWINGS

FIG. 2 is a figure showing an example of a configuration of a backlight according to the first and second embodiments;

FIGS. 4A and 4B are diagrams each showing an example of a BL light emission data table according to the first and second embodiments;

FIG. 19 is a figure showing an example of the relation between display regions of the two still image, and divided regions;

FIGS. 24A and 24B are figures showing an example of the display image according to the fourth embodiment;

FIG. 27 is a figure showing an example of transition of the light emission brightness of a sub light source according to the fourth embodiment;

FIG. 28 is a block diagram showing an example of a function configuration of a light emission brightness comparison unit according to a fifth embodiment.

DESCRIPTION OF THE EMBODIMENTS

First Embodiment

A display apparatus and a control method thereof according to a first embodiment of the present invention will be hereinafter described.

In this embodiment, an example in which the display apparatus is a liquid crystal display apparatus will be described. However, the display apparatus is not limited to a liquid crystal display apparatus. As long as the display apparatus includes independent light sources, and displays an image by transmitting light from the light sources, any display apparatus may be employed.

(As to Overall Configuration of Liquid Crystal Display Apparatus)

Figure 1:
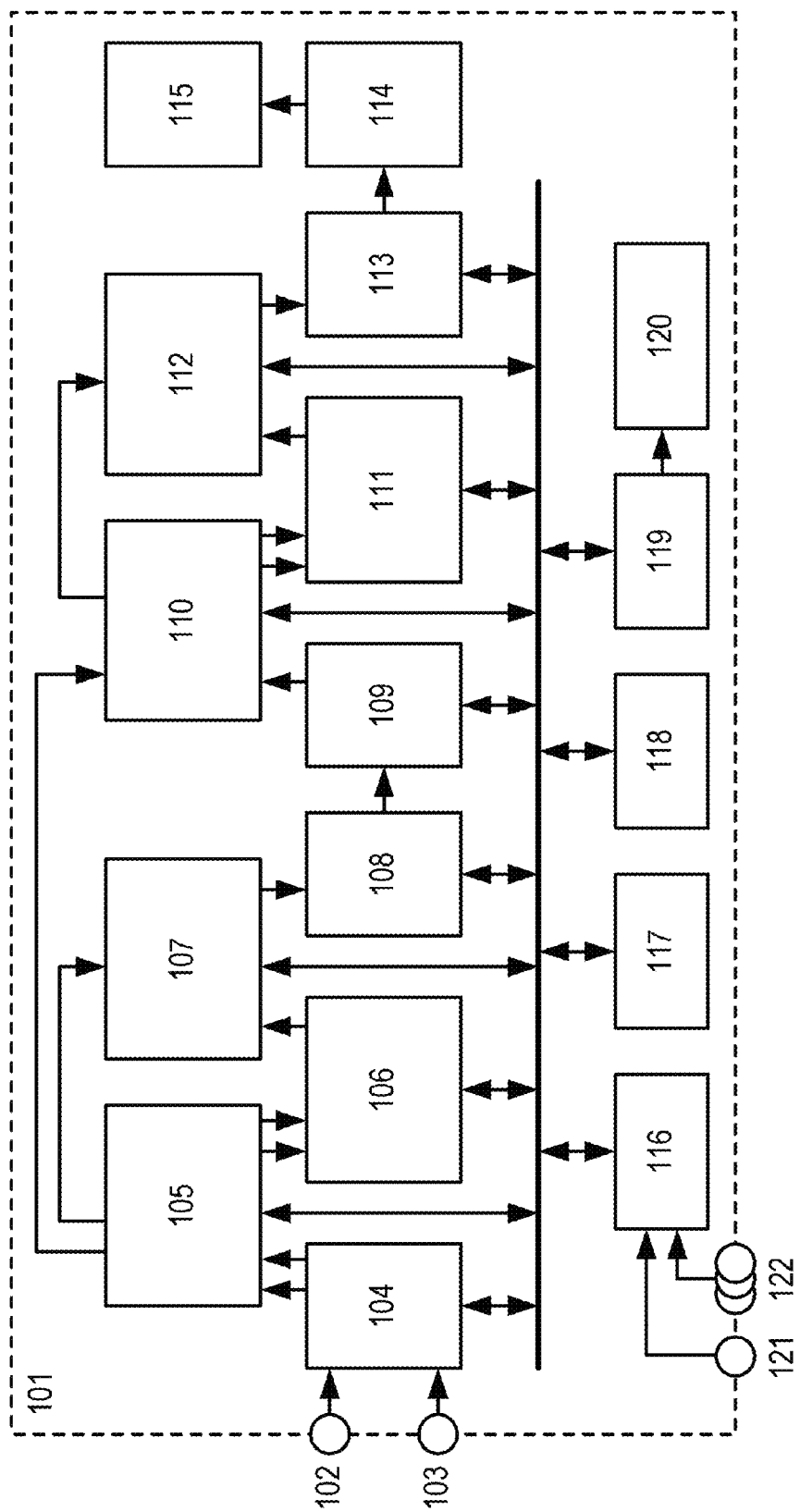
FIG. 1 is a block diagram showing an example of a function configuration of a liquid crystal display apparatus according to first and second embodiments.

FIG. 1 is a block diagram showing an example of a function configuration of a liquid crystal display apparatus according to this embodiment.

As shown in FIG. 1, a liquid crystal display apparatus 101 has a first image input unit 102, a second image input unit 103, an image determination unit 104, a first selector 105, a first synthesis unit 106, a second selector 107, an image analysis unit 108, an image correction unit 109, a third selector 110, a second synthesis unit 111, a fourth selector 112, an image output unit 113, a liquid crystal drive unit 114, a liquid crystal panel 115, a system control unit 116, a non-volatile memory 117, a correction value decision unit 118, a BL control unit 119, a backlight 120, a power button 121, an operation button group 122, and the like.

The first image input unit 102, and the second image input unit 103 input, in the liquid crystal display apparatus 101, a plurality of images that are displayed together, and outputs the input plurality of images to the image determination unit 104. Specifically, the first image input unit 102 and the second image input unit 103 each input a single image (a still image or a moving image).

The image determination unit 104 determines whether each of the images output from the first image input unit 102 and the second image input unit 103 is a still image or a moving image. Specifically, the image determination unit 104 determines whether the image output from the first image input unit 102 is a still image or a moving image, and determines whether the image output from the second image input unit 103 is a still image or a moving image. Then, the image determination unit 104 outputs the determination results to the system control unit 116, and outputs, to the first selector 105, the plurality of images (two images) output from the first image input unit 102 and the second image input unit 103.

The first selector 105 outputs, to any one of the first synthesis unit 106, the second selector 107, and the third selector 110, the plurality of images output from the image determination unit 104, according to an instruction from the system control unit 116. Specifically, in a case where the plurality of images include a still image, and the plurality of images are displayed in a PinP (picture-in-picture) mode, a still image in the plurality of images is output to the third selector 110, and a moving image in the plurality of images is output to the second selector 107. In a case other than the above case, the plurality of images are output to the first synthesis unit 106.

The first synthesis unit 106 synthesizes the input plurality of images according to an instruction from the system control unit 116, and generates a synthesis image for displaying the plurality of images together. Then, the first synthesis unit 106 outputs the generated synthesis image to the second selector 107.

The second selector 107 outputs the image (synthesis image input from the first synthesis unit 106, or the moving image input from the first selector 105) to the image analysis unit 108 according to an instruction from the system control unit 116.

The image analysis unit 108 acquires a characteristic value of the image (image input from the second selector 107), which is displayed on each of divided regions, per divided region obtained by dividing a screen, according to an instruction from the system control unit 116. Then, the image analysis unit 108 outputs the characteristic value of each divided region to the correction value decision unit 118. Additionally, the image analysis unit 108 outputs, to the image correction unit 109, the image input from the second selector 107.

The image correction unit 109 corrects the image input from the image analysis unit 108, according to an instruction from the system control unit 116. Then, the image correction unit 109 outputs the corrected image (image input from the image analysis unit 108 in a case where the image is not corrected) to the third selector 110.

The third selector 110 outputs the input image (image input from the image correction unit 109 (the moving image or the synthesis image), or the still image input from the first selector 105) to either the second synthesis unit 111 or the fourth selector 112 according to an instruction from the system control unit 116. Specifically, the synthesis image input from the image correction unit 109 is output to the fourth selector 112. The moving image input from the image correction unit 109, and the still image input from the first selector 105 are output to the second synthesis unit 111.

The second synthesis unit 111 synthesizes the plurality of images (the still image and the moving image) input from the third selector 110, according to an instruction from the system control unit 116, and generates a synthesis image for displaying the plurality of images together. Then, the second synthesis unit 111 outputs the generated synthesis image to the fourth selector 112.

The fourth selector 112 outputs the input image (the synthesis image input from the third selector 110, or the synthesis image input from the second synthesis unit 111) to the image output unit 113 according to an instruction from the system control unit 116.

The image output unit 113 converts data of the synthesis image input from the fourth selector 112 into display data suitable for the display resolution, the number of display colors, and the refresh rate of the liquid crystal panel 115, according to an instruction from the system control unit 116. Then, the image output unit 113 outputs the converted data (display data) to the liquid crystal drive unit 114.

The liquid crystal drive unit 114 converts, into a control signal for controlling the transmittance of the liquid crystal panel 115, the display data input from the image output unit 113. Then, the liquid crystal drive unit 114 outputs the control signal to the liquid crystal panel 115.

The liquid crystal panel 115 is a display panel that displays an image on the screen by transmitting light from the backlight 120. The liquid crystal panel 115 has a plurality of pixels whose transmittance (the rate of light transmitted through the liquid crystal panel 115 with respect to light illuminated from the backlight 120) varies according to the control signal input from the liquid crystal drive unit 114.

The system control unit 116 controls each function that the liquid crystal display apparatus 101 has.

The non-volatile memory 117 stores a plurality of pieces of information related to the operation of the liquid crystal display apparatus 101.

The correction value decision unit 118 and the BL control unit 119 set the light emission brightness (light emission brightness of the backlight 120) for each divided region according to an instruction from the system control unit 116. In this embodiment, the light emission brightness (light emission brightness luminance) is set for each divided region on the basis of the image to be displayed, and the characteristic value of each divided region acquired by the image analysis unit 108. Specifically, in a case where the plurality of images includes a still image, and the plurality of images are displayed in the PinP mode, the same light emission brightness is set with respect to the plurality of divided regions, at least a part of each of which includes the still image to be displayed, and the light emission brightness based on the characteristic value of each divided region is set with respect to the divided regions where the still image is not displayed. In a case other than the above case, the light emission brightness based on the characteristic value of each divided region is set per divided region.

The correction value decision unit 118 determines an image data correction value that is used when the image correction unit 109 corrects the moving image, and a BL light emission data correction value that is used when the BL control unit 119 sets the light emission brightness of each divided region, according to an instruction from the system control unit 116. Then, the correction value decision unit 118 outputs the image data correction value to the image correction unit 109, and outputs the BL light emission data correction value to the BL control unit 119.

The BL control unit 119 sets light emission brightness of each divided region according to an instruction from the system control unit 116.

The backlight 120 emits light at the light emission brightness that is set per divided region. Specifically, the backlight 120 is provided on a back surface side of the liquid crystal panel 115, and applies light to the back surface of the liquid crystal panel 115. The backlight 120 has light sources for each divided region. The light sources of the respective divided regions are individually controlled at the set light emission brightness.

(As to Configuration and Basic Control of Backlight)

Figure 2:
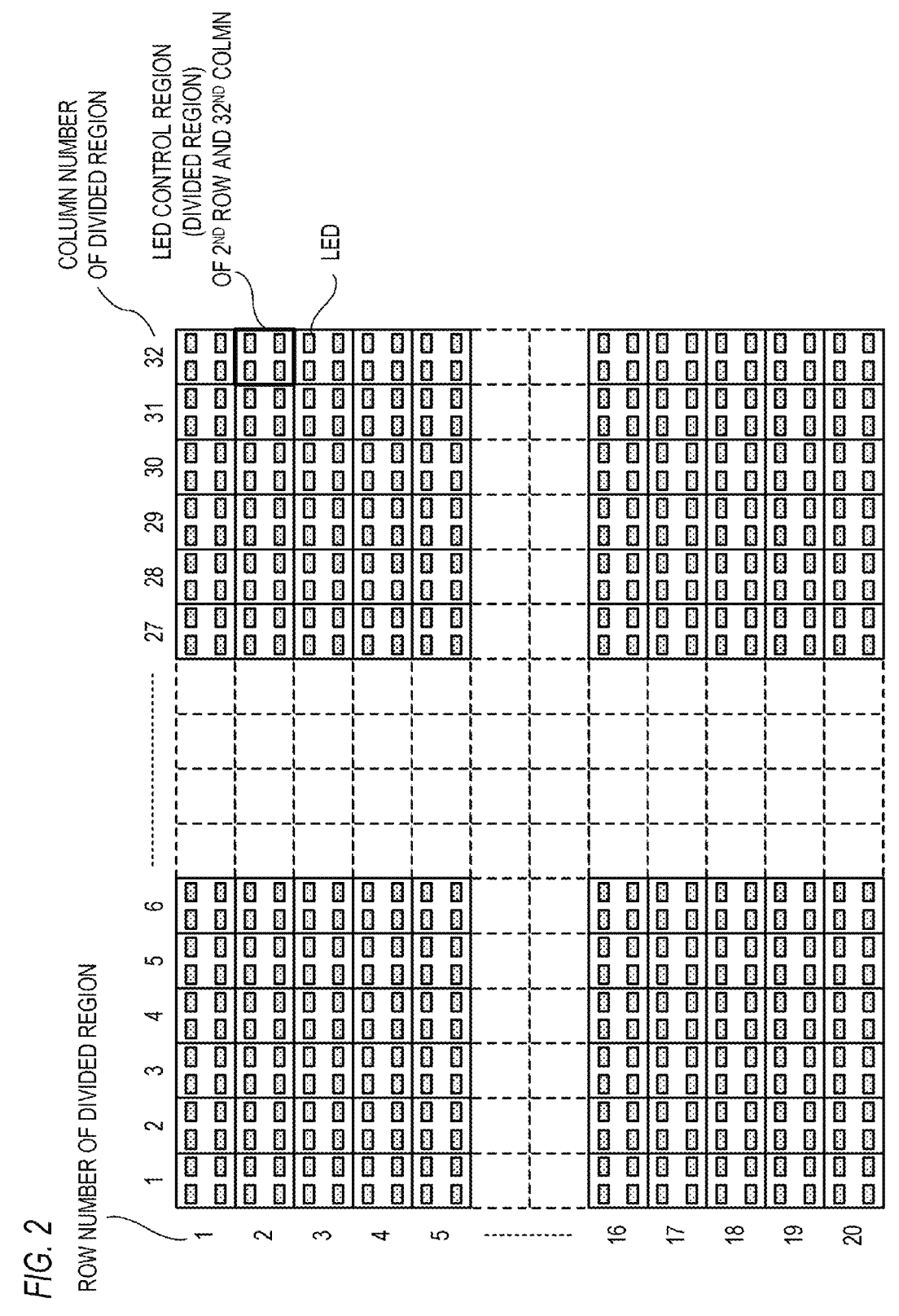

FIG. 2 shows an example of a configuration of the backlight 120 according to this embodiment. In this embodiment, as shown in FIG. 2, the backlight 120 is configured from a total of 640 LED control regions corresponding to 640 divided regions of 32 in the horizontal direction×20 in the vertical direction. The light sources (four white LEDs in the example of FIG. 2) are provided on each divided region (each LED control region). The light sources of the respective divided regions can be individually controlled. The number of the divided regions is not limited to 640. For example, the number of the divided regions may be a total of 160 divided regions of 16 in the horizontal direction×10 in the vertical direction, a total of 1000 divided regions of 40 in the horizontal direction×25 in the vertical direction, a total of 8 divided regions of 1 in the horizontal direction×8 in the vertical direction, or a total of 12 divided regions of 12 in the horizontal direction×1 in the vertical direction.

Figure 3:
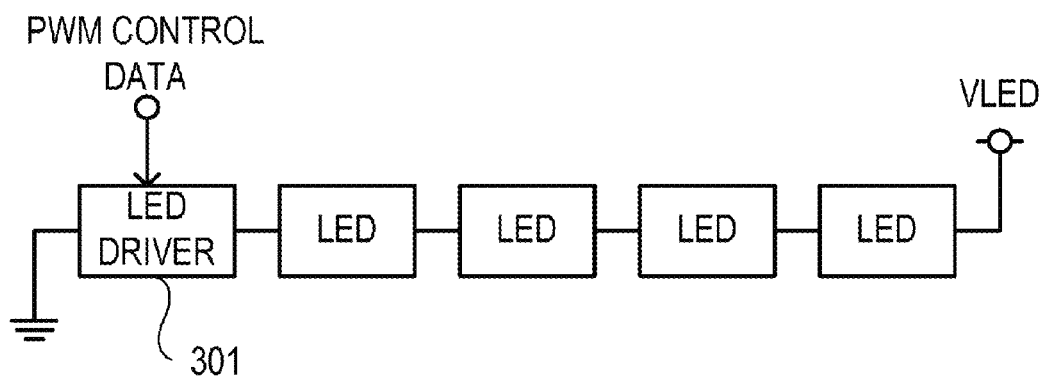
FIG. 3 is a figure showing an example of light sources of a single divided region according to the first and second embodiments.

FIG. 3 shows an example of the light sources of the single divided region. In this embodiment, as shown in FIG. 3, as the light sources of the single divided region, serially connected four white LEDs are used. In each divided region, an LED driver 301 that causes a current to flow in the light sources in the divided region, thereby emitting light is provided. The LED driver 301 performs pulse width modulation (PWM) according to PWM control data input from the BL control unit 119, and causes a current to flow in the light sources (four LEDs). The PWM control data represents the amount of a current that flows in the light sources with the LED driver 301 (time during which a current flows in the light sources (pulse width)).

The BL control unit 119 determines BL light emission data (values of 0 to 4095) that represents the light emission brightness, and converts the BL light emission data into PWM control data. Then, the BL control unit 119 outputs the PWM control data to the LED driver 301. In this embodiment, the higher the light emission brightness, the larger the value of the BL light emission data. The range of the values of the BL light emission data is not limited to 0 to 4095. The range of the values of the BL light emission data may be narrower or wider than 0 to 4095.

In this embodiment, the non-volatile memory 117 previously stores a table (BL light emission data table) representing the correspondence relation between each divided region, and the BL light emission data for emitting light of the backlight in the divided region at predetermined light emission brightness. An apparatus (not shown) that is different from the liquid crystal display apparatus 101 creates the BL light emission data table in a manufacturing process of the liquid crystal display apparatus 101. For example, the BL light emission data is adjusted such that brightness unevenness on the screen is minimized, thereby creating the BL light emission data table.

In this embodiment, the non-volatile memory 117 previously stores 10 BL light emission data tables corresponding to 10 light emission brightness (10 light emission brightness at intervals of 20 $cd/m^2$) obtained by dividing light emission brightness of 20 to 200 $cd/m^2$ equally among ten. Additionally, the non-volatile memory 117 previously stores 10 backlight brightness values which are the aforementioned 10 light emission brightness.

FIGS. 4A and 4B each show an example of the BL light emission data table.

FIG. 4A is an example of BL light emission data for emitting light of the whole of the backlight (backlight in each divided region) at light emission brightness of 100 $cd/m^2$.

FIG. 4B is an example of BL light emission data for emitting light of the whole of the backlight (backlight in each divided region) at light emission brightness of 200 $cd/m^2$.

In FIGS. 4A and 4B, the reason why the BL light emission data differs between the divided regions is that light emission characteristics are different for each LED.

The number of the previously prepared BL light emission data tables is not limited to ten. The number of the previously prepared BL light emission data tables may be fewer or greater than ten. The number of the previously prepared BL light emission data tables may be one.

The BL control unit 119 acquires a backlight brightness value (light emission brightness) from the non-volatile memory 117, according to a lighting control request (light emission brightness) from the system control unit 116. The backlight brightness value includes a default value, a value designated by a user, a value set according to the types or the like of an image to be displayed. The BL control unit 119 acquires the BL light emission data table corresponding to the backlight brightness value from the non-volatile memory 117. For example, in a case where the backlight brightness value is "100 $cd/m^2$", the BL light emission data shown in FIG. 4A is acquired. The BL control unit 119 corrects BL light emission data in the acquired BL light emission data table per divided region by using the BL light emission data correction value input from the correction value decision unit 118. Through this process, the light emission brightness of each divided region is determined (set). The BL control unit 119 converts the corrected BL light emission data into PWM control data per divided region. For example, in a case where the corrected BL light emission data is 0, the corrected BL light emission data is converted into PWM control data in which a current amount (time during which a current flows) is 0 such that the backlight (light sources) in the corresponding divided region does not emit light. In a case where the corrected BL light emission data is 4095, the corrected BL light emission data is converted into PWM control data in which the current amount is a maximum value (time during which a current flows is a maximum value) such that the backlight (light sources) in the corresponding divided regions emits light at maximum light emission brightness. The BL control unit 119 outputs the PWM control data of each divided region to the LED driver 301 of the divided region per divided region.

(As to Operation of Liquid Crystal Display Apparatus)

Figure 5:
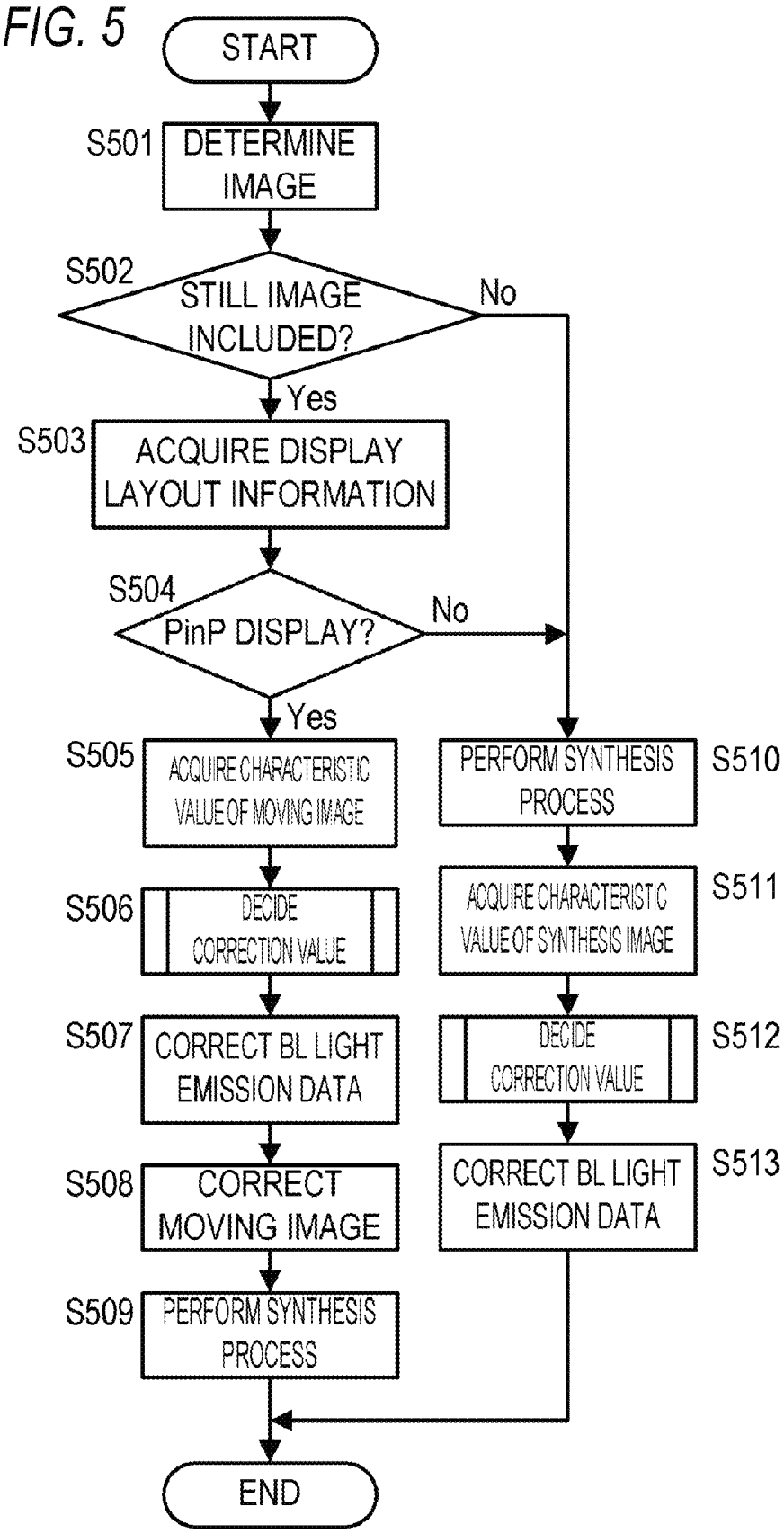
FIG. 5 is a flowchart showing an example of the operation of the liquid crystal display apparatus according to the first embodiment.

FIG. 5 is a flowchart showing an example of the operation of the liquid crystal display apparatus 101 according to this embodiment. FIG. 5 shows an example of the operation in a case where a plurality of images are displayed together. The operation in FIG. 5 starts when the system control unit 116 detects the input of a power-on request, a display mode change request for a change of a display mode for displaying the plurality of images together, and the like. The power-on request is input by operation of the power button 121 by the user. The display mode change request is input by the operation of the operation button group 122 by the user.

First, the image determination unit 104 determines whether the image input from the first image input unit 102 is a still image or a moving image, and determines whether the image input from the second image input unit 103 is a still image or a moving image (S501). For example, pixel values between a plurality of frames are compared, thereby determining whether the image is a still image or a moving image. The image determination unit 104 outputs the determination results to the system control unit 116, and outputs, to the first selector 105, the two images input from the first image input unit 102 and the second image input unit 103.

The system control unit 116 determines from the determination results of the image determination unit 104 whether or not the plurality of images (two images input from the first image input unit 102 and the second image input unit 103) to be displayed together includes a still image (S502). When the plurality of images include the still image, the process advances to S503. When the plurality of images does not include the still image, the process advances to S510.

In S503, the system control unit 116 acquires display layout information from the non-volatile memory 117. The display layout information includes data on the types of display form, display region information of each image, and the like. Examples of the type of the display mode include PinP display, and PoutP display (picture-out-picture display), and the like. The display region information is information that represents a region on the screen in which an image is displayed (display region). The display region information includes, for example, a start point and an end point of the display region, and the position and the size of the display region. One piece of the display layout information may be prepared, or a plurality of pieces of the display layout information may be prepared. In a case where the plurality of pieces of display layout information are prepared, default display layout information may be acquired, or display layout information according to the operation of the user or the type of the image to be displayed may be acquired.

The system control unit 116 determines on the basis of the display layout information acquired in S503 whether or not the display mode is PinP display (S504). When the display mode is PinP display, the process advances to S505. When the display mode is not PinP display, the process advances to S510.

(Case where a Plurality of Images Include Still Image, and are Displayed in PinP Mode)

In S505, the system control unit 116 controls the apparatus such that the first selector 105 outputs, to the third selector 110, the still image in the two images input from the image determination unit 104, and outputs the moving image to the image analysis unit 108, on the basis of the determination results of the image determination unit 104. The image analysis unit 108 acquires the characteristic value of the moving image (moving image input from the first selector 105) displayed on the divided region per divided region. In this embodiment, an average brightness level (APL) is acquired as the characteristic value. Then, the image analysis unit 108 outputs the characteristic value of each divided region to the correction value decision unit 118. Additionally, the image analysis unit 108 outputs, to the image correction unit 109, the moving image input from the first selector 105. In a case where both the two images input from the image determination unit 104 are the still images, these two images are sent from the first selector 105 to the third selector 110.

The correction value decision unit 118 determines a BL light emission data correction value and an image data correction value on the basis of the characteristic value of each divided region input from the image analysis unit 108, and the display layout information input from the system control unit 116 (S506).

Figure 6:
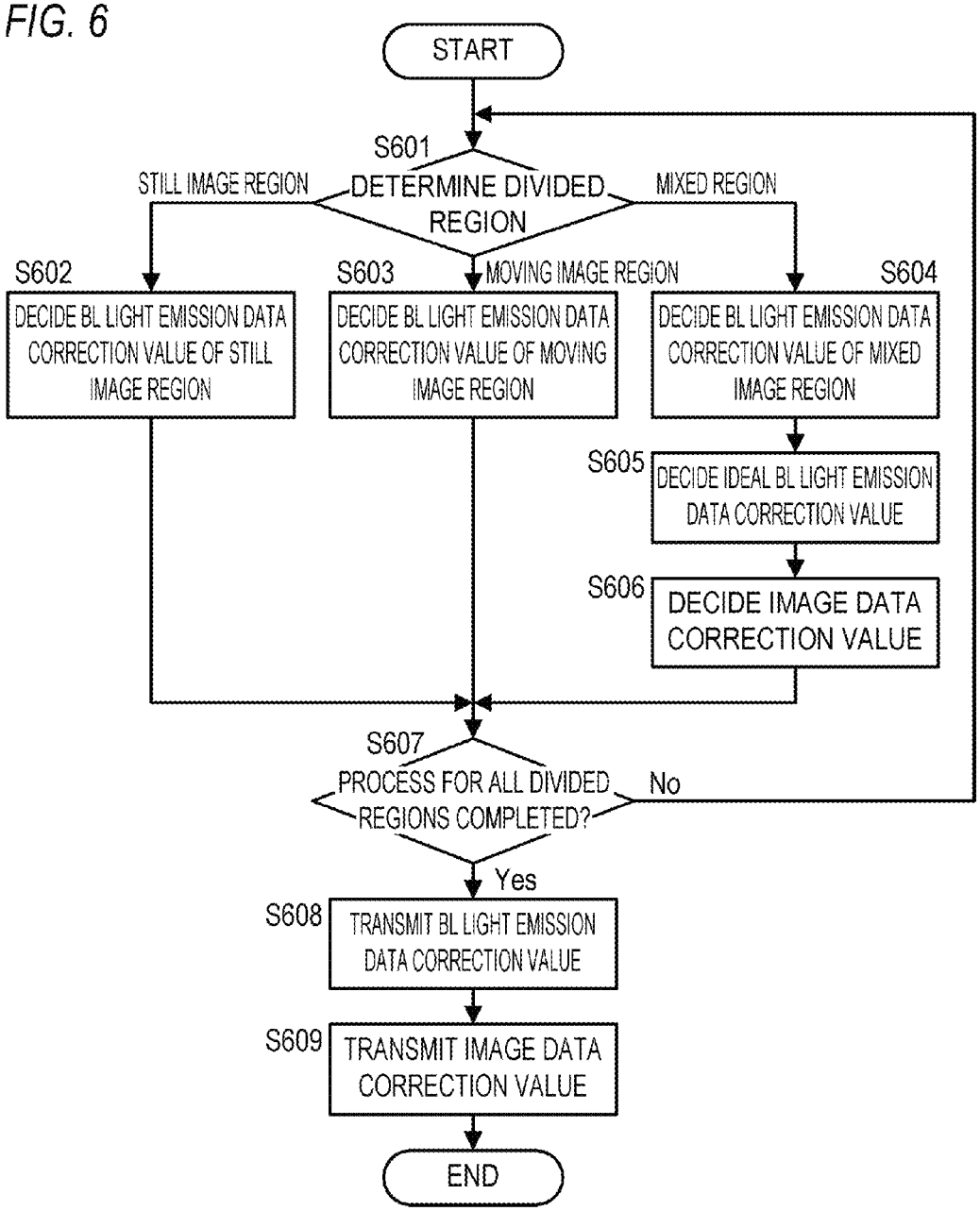
FIG. 6 is a flowchart showing an example of processes of S506 in FIG. 5.
Figure 7:
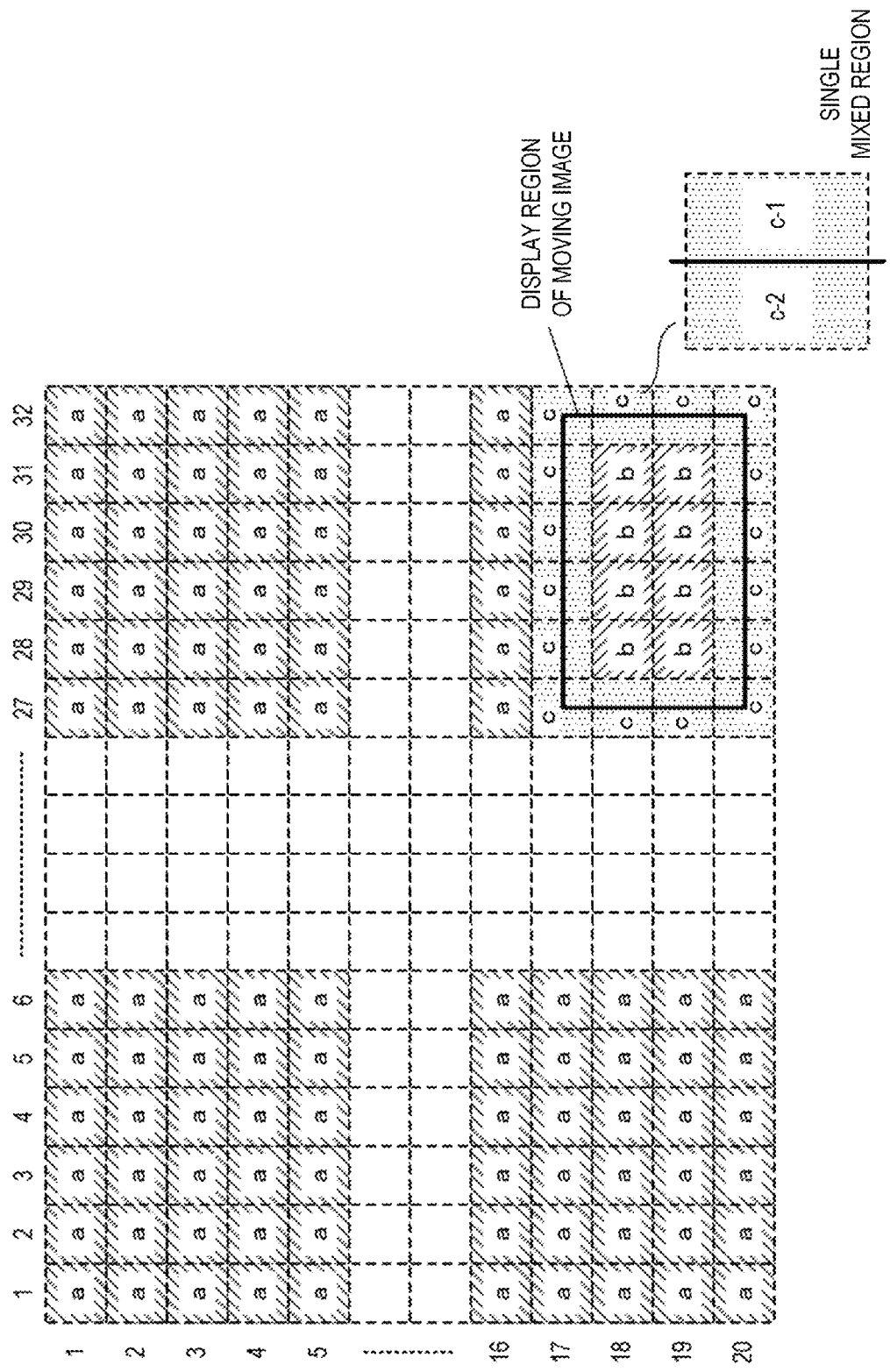
FIG. 7 is a diagram showing an example of the relation between display regions of a still image and a moving image, and divided regions.

The processes of S506 will be described in detail. FIG. 6 is a flowchart showing an example of the processes of S506. FIG. 7 is a diagram showing an example of the relation between the display regions of the still image and the moving image, and the divided regions, in a case where the still image and the moving image are displayed in the PinP mode. First, the correction value decision unit 118 determines on the basis of the display layout information whether the divided region to be processed (to be calculated for a correction value) is among a still image region, a moving image region, and a mixed region (S601). The still image region is a divided region where only a still image is displayed. The moving image region is a divided region where only a moving image is displayed. The mixed region is a divided region where both a still image and a moving image are displayed. In FIG. 7, regions shown by broken lines are the divided regions. In FIG. 7, symbol a denotes the still image region, symbol b denotes the moving image region, and symbol c denotes the mixed region. In a case where the divided region to be processed is the still image region, the process advances to S602. In a case where the divided region to be processed is the moving image region, the process advances to S603. In a case where the divided region to be processed is the mixed region, the process advances to S604.

In S602, the correction value decision unit 118 determines a BL light emission data correction value of the divided region to be processed (still image region). In this embodiment, the BL light emission data of each still image region is not corrected, and therefore the BL light emission data correction value is decided as Thereafter, the process advances to S607.

Figure 8:
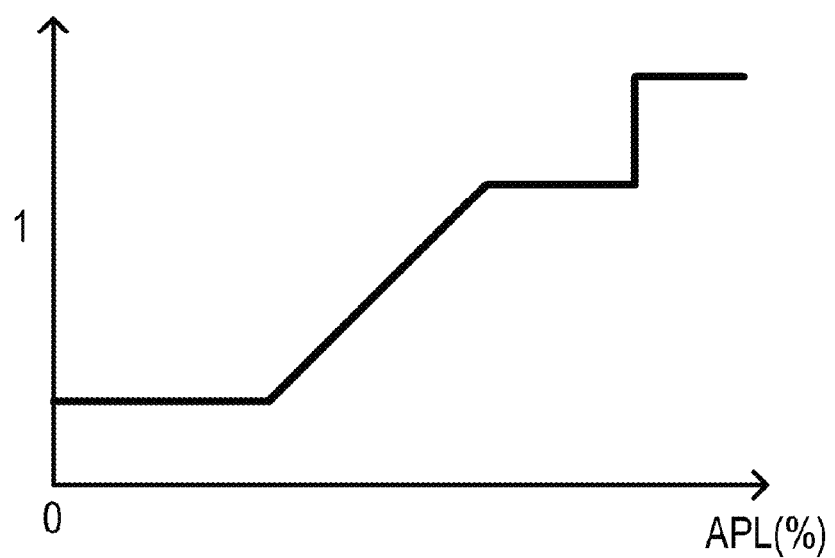
FIG. 8 is a diagram showing an example of a BL light emission data correction value table according to the first and second embodiments.

In S603, the correction value decision unit 118 determines a BL light emission data correction value of the divided region to be processed (moving image region). In this embodiment, a BL light emission data correction value for correcting the BL light emission data of the moving image region of the BL light emission data based on the characteristic value of the moving image is determined. For example, the BL light emission data correction value is determined such that the light emission brightness of the moving image region where a dark image is displayed is lower than that of the divided region where a bright image is displayed. Specifically, the BL light emission data correction value is determined from the APL that is the characteristic value of the divided region to be processed (moving image region), and a BL light emission data correction value table stored in the non-volatile memory 117. The BL light emission data correction value table is a table (or function) indicating the relation between the APL and the BL light emission data correction value. FIG. 8 shows an example of the BL light emission data correction value table. A horizontal axis in FIG. 8 indicates the APL, and a vertical axis indicates the BL light emission data correction value. As shown in FIG. 8, in this embodiment, the BL light emission data correction value obtained when the APL is larger is larger than that obtained when the APL is smaller. In the example of FIG. 8, the BL light emission data correction value can be taken from a value smaller than 1 to a value larger than 1. In the example of FIG. 8, a part where the BL light emission data correction value does not change with respect to the change of the APL exists in the BL light emission data correction value table. However, such a part may not exist. Additionally, in the example of FIG. 8, the BL light emission data correction value linearly changes with respect to the change of the APL. However, the BL light emission data correction value may non-linearly change with respect to the change of the APL. The BL light emission data correction value may change with respect to the change of the APL in stages.

In S604, the correction value decision unit 118 determines a BL light emission data correction value of the divided region to be processed (mixed region). In this embodiment, the BL light emission data of each mixed region is not corrected, and therefore the BL light emission data correction value is determined as "1". Thereafter, the processes of S605 and S606 are performed, and the process advances to S607.

In S605 and S606, the correction value decision unit 118 determines an image data correction value. The image data correction value is a correction value for correcting the moving image such that brightness on the screen of the moving image in the mixed region does not change between a case where the backlight emits light at a light emission brightness based on the characteristic value, and a case where the backlight emits light at a set light emission brightness. A region of the moving image in the mixed region (in the divided region where both the still image and the moving image are displayed) is, for example, a region indicated by a symbol c-2 in FIG. 7. A region indicated by a symbol c-1 in FIG. 7 is a region of the still image in the mixed region.

In S605, the correction value decision unit 118 determines a BL light emission data correction value (ideal BL light emission data correction value) determined when it is assumed that only the moving image is displayed (the still image is not displayed) with respect to the divided regions to be processed (mixed regions). The ideal BL light emission data correction value is determined from the APL that is the characteristic value of each divided region to be processed (the characteristic value of the moving image), and the BL light emission data correction value table (FIG. 8) stored in the non-volatile memory 117, similarly to a method of determining the BL light emission data correction value of the moving image region.

Figure 9:
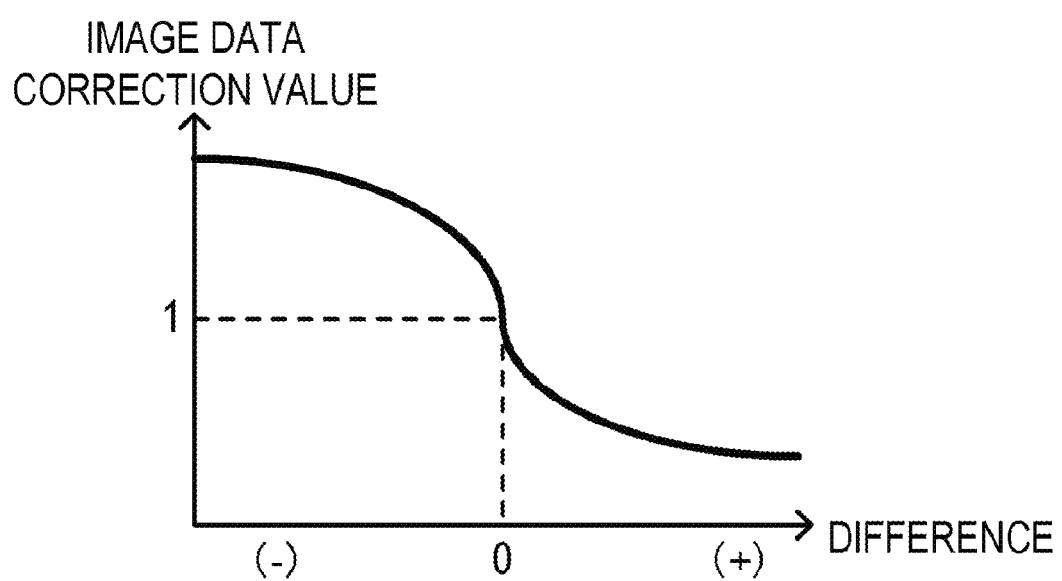
FIG. 9 is a diagram showing an example of an image data correction value table according to the first and second embodiments.

In S606, the correction value decision unit 118 determines an image data correction value that is applied to each pixel of the moving image in the divided regions to be processed (mixed regions). Specifically, the image data correction value is determined by using the difference between the BL light emission data correction value determined in S604, and the ideal BL light emission data correction value determined in S605, and an image data correction value table stored in the non-volatile memory 117. The image data correction value table is a table (or a function) showing the relation between the difference (the BL light emission data correction value determined in S604—the ideal BL light emission data correction value determined in S605) of the BL light emission data correction value, and the image data correction value. FIG. 9 shows an example of the image data correction value table. The horizontal axis in FIG. 9 indicates the difference of the BL light emission data correction value, and the vertical axis indicates the image data correction value. As shown in FIG. 9, in this embodiment, the image data correction value obtained when the difference is larger is larger than that obtained when the difference is smaller. As shown in FIG. 9, the BL light emission data correction value is 1 when the difference is 0. In the example of FIG. 9, the image data correction value non-linearly changes with respect to the change of the difference. However, the image data correction value may linearly change with respect to the change of the difference. The image data correction value may change with respect to the change of the difference in stages. Alternatively, in the image data correction value table, a part where the image data correction value does not change with respect to the change of the difference may exist.

In S607, the correction value decision unit 118 determines whether the processes of S601 to S606 are performed for all of the divided regions. When there is a divided region for which the processes of S601 to S606 are not performed (unprocessed divided region), the correction value decision unit 118 switches the divided region to be processed into an unprocessed divided region, and the process is returned to S601. When the processes of S601 to S606 are performed for all of the divided regions, the process advances to S608.

In S608, the correction value decision unit 118 outputs the BL light emission data correction value of each divided region to the BL control unit 119.

In S609, the correction value decision unit 118 outputs the image data correction value of each mixed region (each pixel of the moving image in the mixed region) to the image correction unit 109.

The description will return to the description of FIG. 5. In a process next to S506, the BL control unit 119 multiplies the BL light emission data determined from the BL light emission data table by the BL light emission data correction value input from the correction value decision unit 118 per divided region (S507; correction of the BL light emission data). Consequently, the light emission brightness of each divided region is determined (set). The BL control unit 119 converts the corrected BL light emission data into the PWM control data per divided region.

The image correction unit 109 multiplies the moving image input from the image analysis unit 108 by the image data correction value input from the correction value decision unit 118 (S508; correction of the moving image). The image correction unit 109 outputs the corrected moving image to the third selector 110. In a case where both of the two images displayed together are the still images, the moving images are not input in the image analysis unit 108 and the image correction unit 109, and the process of S508 is not performed.

Then, the system control unit 116 controls such that the third selector 110 outputs, to the second synthesis unit 111, the moving image input from the image correction unit 109 and the still image input from the first selector 105. Furthermore, the system control unit 116 controls the apparatus such that the second synthesis unit 111 generates, on the basis of the display layout information, a synthesis image for displaying the input still image and moving image in the PinP mode (S509). The second synthesis unit 111 outputs the generated synthesis image to the image output unit 113. In the case where both of the two images displayed together are the still images, the moving image is not sent from the image correction unit 109 to the third selector 110, and the two still images are sent from the first selector 105 to the third selector 110. Then, the two still images are sent from the third selector 110 to the second synthesis unit 111, and a synthesis image for displaying these two still images in the PinP mode is generated.

The BL control unit 119 transmits the PWM control data of each divided region to the backlight 120. Consequently, the backlight 120 emits light at light emission brightness that is set per divided region. The image output unit 113 generates display data from the synthesis image to output the display data to the liquid crystal drive unit 114. Then, the liquid crystal drive unit 114 converts the display data input from the image output unit 113 into a control signal for controlling the transmittance of the liquid crystal panel 115, and outputs the control signal to the liquid crystal panel 115. Consequently, the transmittance of the liquid crystal panel 115 is controlled.

The control of the transmittance and the light emission of the backlight are performed at a predetermined timing, thereby displaying the image on the screen.

(Case where a Plurality of Images does not Include Still Image, or where Case a Plurality of Images are not Displayed in PinP Mode)

In S510, the system control unit 116 controls such that the first selector 105 outputs, to the first synthesis unit 106, the two images input from the image determination unit 104. Furthermore, the system control unit 116 controls the apparatus such that the first synthesis unit 106 generates, on the basis of the display layout information, a synthesis image for displaying the input two images. The first synthesis unit 106 outputs the generated synthesis image to the second selector 107.

The system control unit 116 controls the apparatus such that the second selector 107 outputs, to the image analysis unit 108, the synthesis image input from the first synthesis unit 106. The image analysis unit 108 acquires a characteristic value of the synthesis image (synthesis image input from the second selector 107) displayed on the divided region per divided region (S511). Then, the image analysis unit 108 outputs the characteristic value of each divided region to the correction value decision unit 118. Additionally, the image analysis unit 108 outputs, to the image correction unit 109, the synthesis image input from the second selector 107.

The correction value decision unit 118 determines a BL light emission data correction value on the basis of the characteristic value of each divided region input from the image analysis unit 108 (S512). The BL light emission data correction value of each divided region is determined from the APL that is the characteristic value of each divided region to be processed, and the BL light emission data correction value table (FIG. 8) stored in the non-volatile memory 117, similarly to the method of deciding the BL light emission data correction value of the moving image region.

The BL control unit 119 multiplies the BL light emission data determined from the BL light emission data table by the BL light emission data correction value input from the correction value decision unit 118 per divided region (S513; correction of the BL light emission data). Consequently, the light emission brightness of each divided region is determined (set). The BL control unit 119 converts the corrected BL light emission data into PWM control data per divided region.

The BL control unit 119 transmits the PWM control data of each divided region to the backlight 120. Consequently, the backlight 120 emits light at the light emission brightness that is set per divided region. The image correction unit 109 outputs, to the third selector 110, the synthesis image input from the image analysis unit 108. The third selector 110 outputs, to the fourth selector 112, the synthesis image input from the image correction unit 109. The fourth selector 112 outputs, to the image output unit 113, the synthesis image input from the third selector 110. The image output unit 113 generates display data from the synthesis image to output the display data to the liquid crystal drive unit 114. Then, the liquid crystal drive unit 114 converts the display data input from the image output unit 113 into a control signal for controlling the transmittance of the liquid crystal panel 115, and outputs the control signal to the liquid crystal panel 115. Consequently, the transmittance of the liquid crystal panel 115 is controlled.

The control of the transmittance and the light emission of the backlight are performed at a predetermined timing, thereby displaying the image on the screen.

As described above, according to this embodiment, in a case where a still image and a moving image are displayed in the PinP mode, the same light emission brightness is set with respect to a plurality of divided regions, at least a part of each of which includes the still image to be displayed, and the light emission brightness based on the characteristic value of each divided region is set with respect to the divided regions where the still image is not displayed. Consequently, in a case where the moving image is displayed together with the still image (the still image and the moving image are displayed in the PinP mode), it is possible to suppress a reduction in visibility of the still image, and to improve the contrast of the moving image. Additionally, according to this embodiment, in the case where the still image and the moving image are displayed in the PinP mode, the moving image is corrected such that the brightness on the screen of the moving image in the mixed region does not change between the case where the backlight emits light at the light emission brightness based on the characteristic value, and the case where the backlight emits light at the set light emission brightness. Consequently, it is possible to suppress deterioration of the image quality of the moving image resulting from the same light emission brightness being set with respect to the plurality of divided regions, at least a part of each of which includes the still image.

Second Embodiment

A display apparatus and a control method thereof according to a second embodiment of the present invention will be hereinafter described.

In the first embodiment, the configuration, in which deterioration of the image quality of a still image is suppressed in the case where the still image and a moving image are displayed in a PinP mode, is described. In this embodiment, a configuration, in which deterioration of the image quality of a still image is suppressed also in a case where the still image and a moving image are displayed in a PoutP mode, will be described.

An overall configuration of a liquid crystal display apparatus according to this embodiment is similar to that of the first embodiment (FIG. 1), and therefore the description thereof will be omitted.

Similarly, a configuration and basic control of a backlight 120 according to this embodiment are similar to those of the first embodiment, and therefore the description thereof will be omitted.

(As to Operation of Liquid Crystal Display Apparatus)

Figure 10:
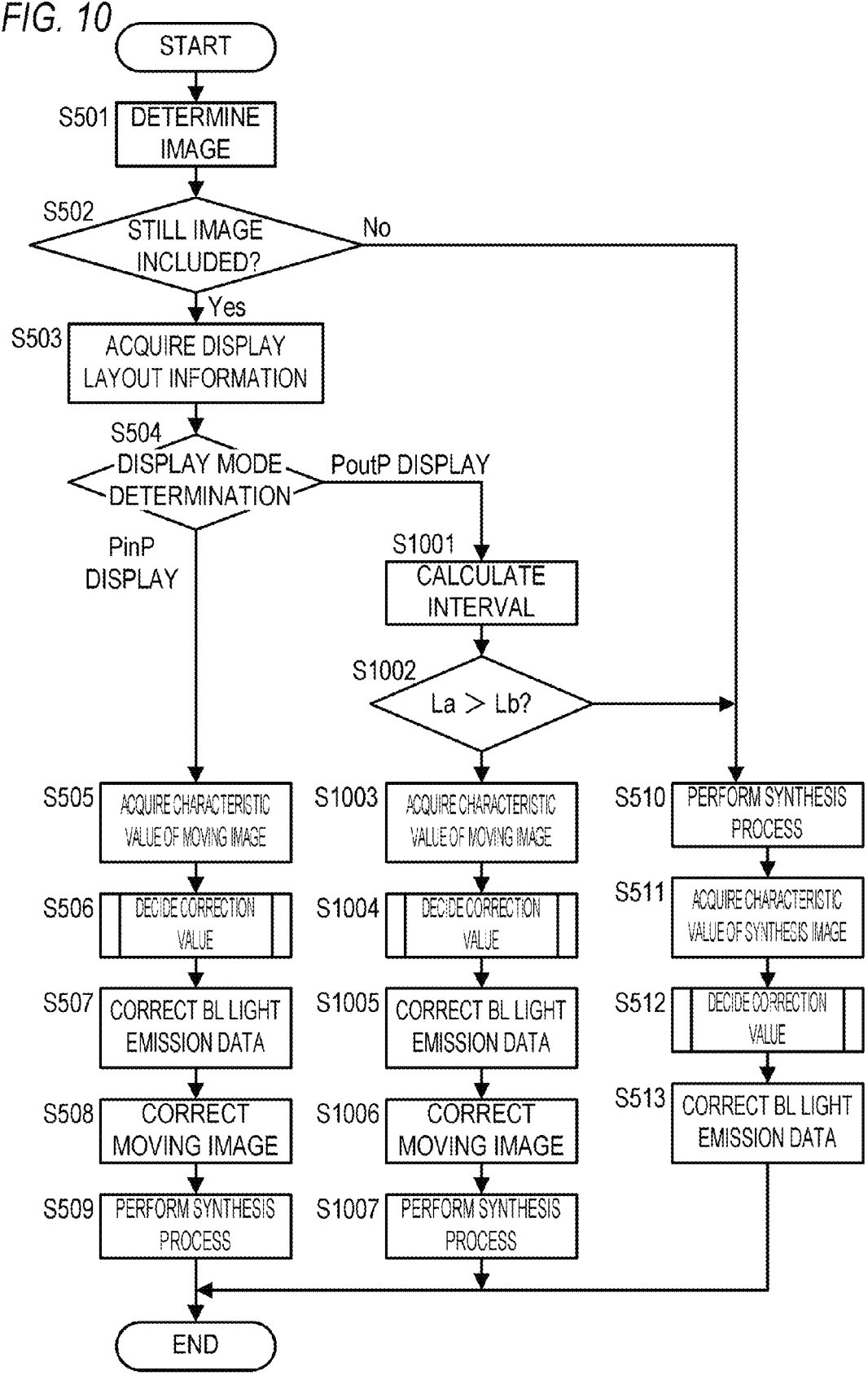
FIG. 10 is a flowchart showing an example of the operation of the liquid crystal display apparatus according to the second embodiment.

FIG. 10 is a flowchart showing an example of the operation of a liquid crystal display apparatus 101 according to this embodiment. FIG. 10 shows an example of the operation in a case where a plurality of images are displayed together. The operation in FIG. 10 starts when a system control unit 116 detects input of a power-on request, a display mode change request, and the like.

Processes of S501 to S503 in FIG. 10 are similar to those of S501 to S503 in FIG. 5, respectively, and therefore the description thereof will be omitted.

In a process next to S503 in FIG. 10, the system control unit 116 determines on the basis of display layout information acquired in S503 whether a display mode is PinP display or PoutP display (S504). When the display mode is the PinP display, the process advances to S505. When the display mode is the PoutP display, the process advances to S1001.

(Case where a Plurality of Images Include Still Image, and are Displayed in PinP Mode)

Processes of S505 to S509 in FIG. 10 are similar to those of S505 to S509 in FIG. 5, respectively, and therefore the description thereof will be omitted.

(Case where a Plurality of Images Include Still Image, and are Displayed in PoutP Mode)

In S1001 in FIG. 10, the system control unit 116 calculates an interval between two images to be displayed in a PoutP mode on the basis of display layout information (display region information of each of the images to be displayed in the PoutP mode) acquired in S503. In other words, the interval between two regions (regions on a screen) where the two images to be displayed in the PoutP mode are displayed is calculated.

The system control unit 116 determines whether or not a divided region, in which both of the two images to be displayed in the PoutP mode are displayed, exists (S1002). Specifically, the system control unit 116 determines whether or not an interval La calculated in S1001 is larger than size Lb of a single divided region. When the interval La is larger than the size Lb, it is determined that the divided region, in which both of the two images to be displayed in the PoutP mode are displayed, does not exist, the process advances to S510. When the interval La is the size Lb or less, it is determined that the divided region, in which both of the two images to be displayed in the PoutP mode are displayed, exists, and the process advances to S1003. A method of determining whether or not the divided region, in which both of the two images to be displayed in the PoutP mode are displayed, exist is not limited to the aforementioned method (method based on the interval between the two images to be displayed in the PoutP mode). For example, whether or not the divided region, in which both of the two images to be displayed in the PoutP mode are displayed, exists may be determined from region information representing each divided region, and display region information of the two images to be displayed in the PoutP mode. As the size Lb, a size larger or smaller than the size of the divided region may be set on the bases of light source characteristics of the backlight (light irradiation angle characteristics) or a diffusion structure of the backlight.

In S1003, the system control unit 116 controls the apparatus such that a first selector 105 outputs, to a third selector 110, the still image in the two images input from an image determination unit 104, and outputs the moving image to an image analysis unit 108, on the basis of the determination results of the image determination unit 104. The image analysis unit 108 acquires the characteristic value of the moving image (moving image input from the first selector 105) displayed on the divided region per divided region. Then, the image analysis unit 108 outputs the characteristic value of each divided region to the correction value decision unit 118. Additionally, the image analysis unit 108 outputs, to an image correction unit 109, the moving image input from the first selector 105.

The correction value decision unit 118 determines a BL light emission data correction value and an image data correction value on the basis of the characteristic value of each divided region input from the image analysis unit 108, and display layout information input from the system control unit 116 (S1004).

The processes of S1004 will be described in detail with reference to the flowchart of FIG. 6, and FIGS. 11 and 12.

Figure 11:
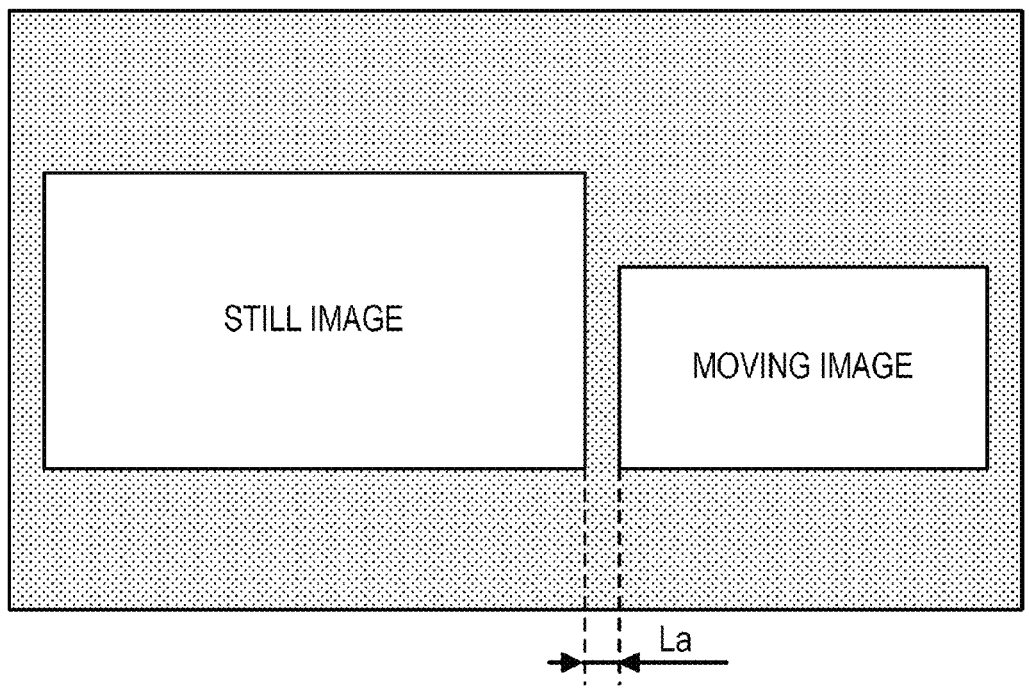
FIG. 11 is a figure showing an example of arrangement of a still image and a moving image to be displayed in a PoutP mode.

FIG. 11 is a figure showing an example of arrangement of a still image and a moving image to be displayed in the PoutP mode (arrangement on the screen). FIG. 12 is a figure showing the relation between display regions of the still image and the moving image, and the divided regions in the case of the PoutP display in FIG. 11.

In the example of FIG. 11, the still image and the moving image are arranged at the interval La. A predetermined background image is displayed in regions where both the still image and the moving image are not displayed, among regions of the screen. The background image is, for example, an image of uniform color (such as black or gray).

In S601, the background image is treated as a still image, and a process similar to that in the first embodiment is performed.

Figure 12:
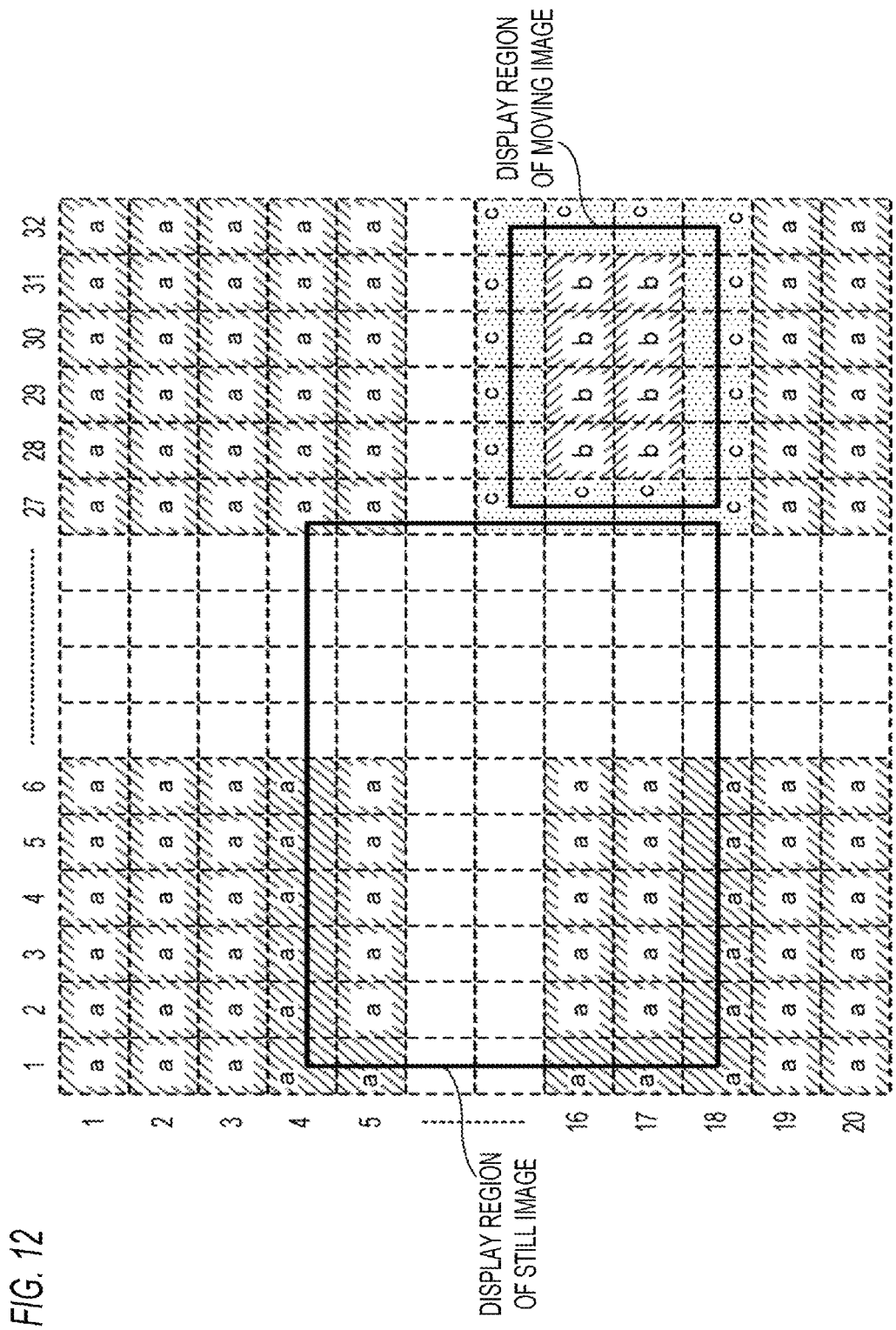
FIG. 12 is a figure showing an example of the relation between display regions of the still image and the moving image, and divided regions.
Figure 13:
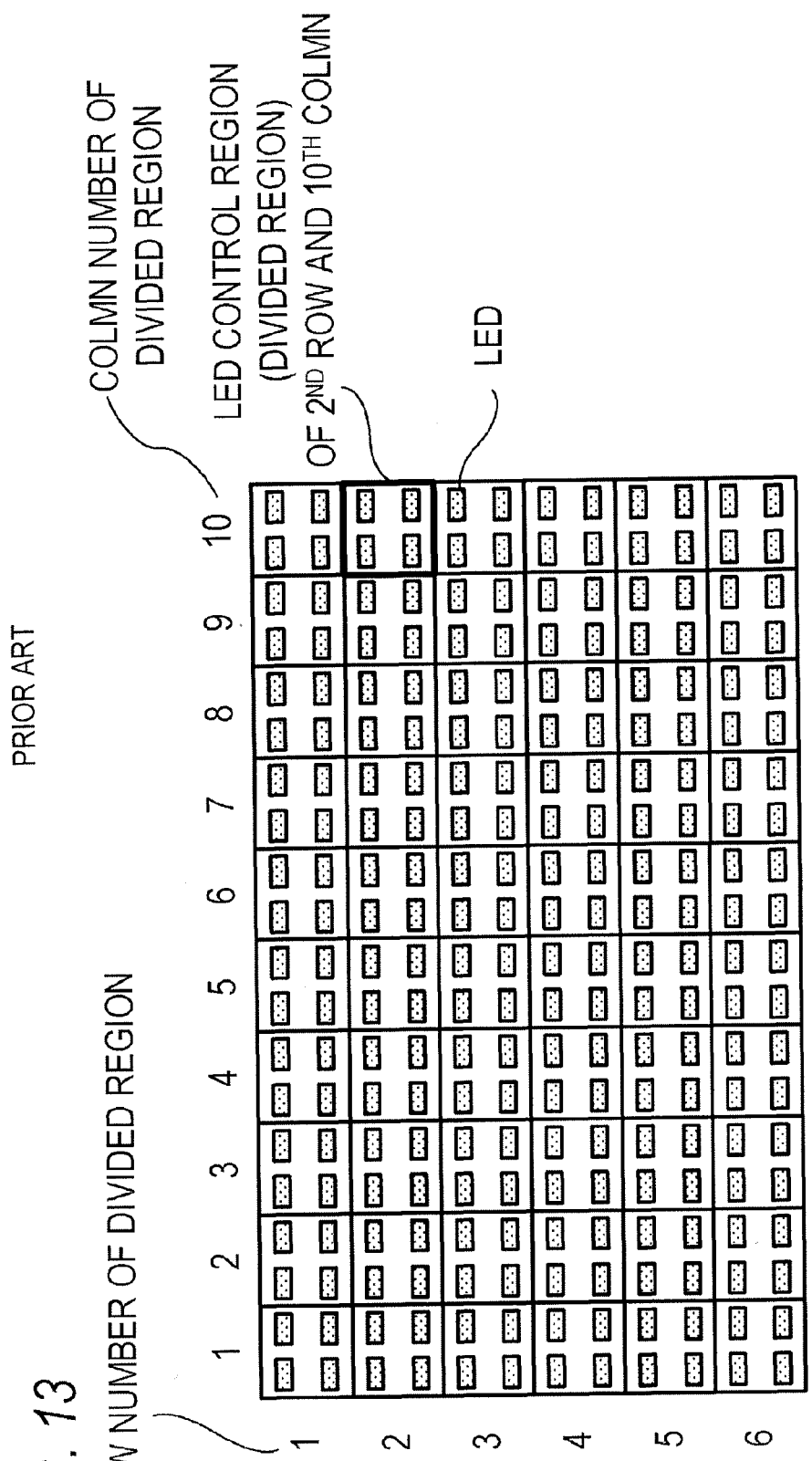
FIG. 13 is a figure showing an example of a configuration of the backlight enabling local dimming control.
Figure 14:
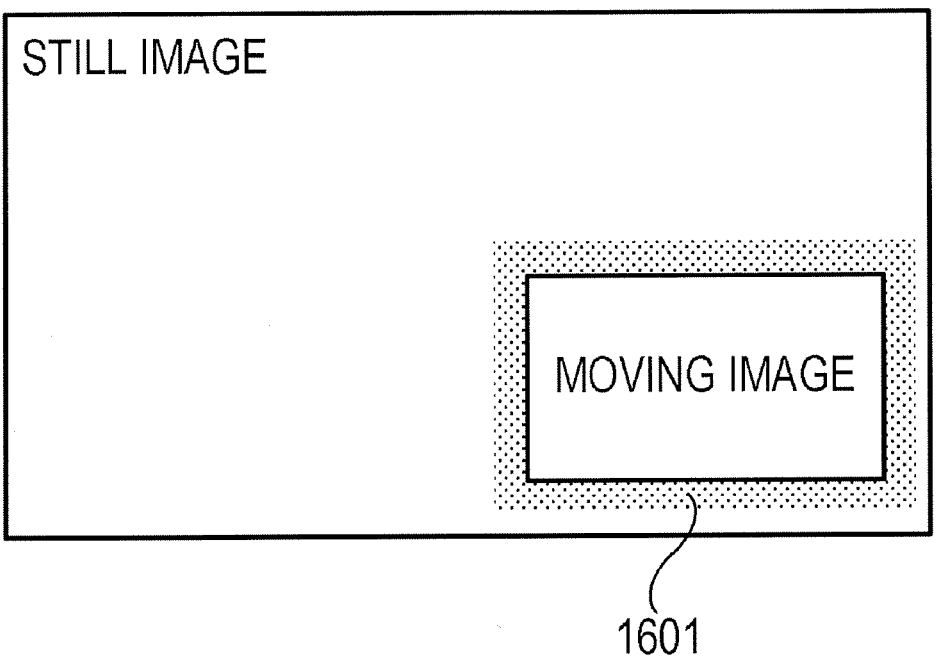
FIG. 14 is a figure showing an example of deterioration of the image quality of a still image in a conventional technology.
Figure 15A:
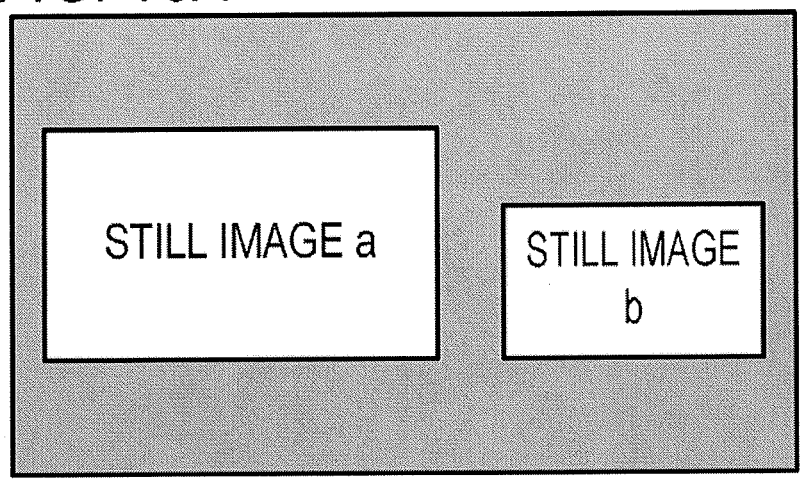
FIGS. 15A and 15B are figures showing an example of deterioration of the image quality of a still image in a conventional technology.
Figure 15B:
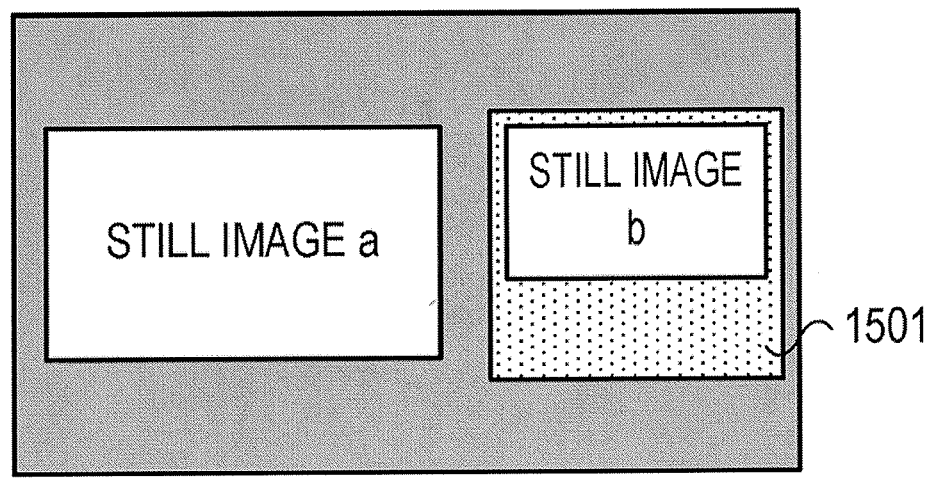

In FIG. 12, regions shown by broken lines are the divided regions. In FIG. 12, symbol a denotes a still image region, symbol b denotes a moving image region, and symbol c denotes a mixed region.

In a case where a divided region to be processed is the still image region, the process advances to S602. In a case where the divided region to be processed is the moving image region, the process advances to S603. In a case where the divided region to be processed is the mixed region, the process advances to S604.

In S602 to S609, processes similar to those in the first embodiment are performed.

The description will return to the description of FIG. 10. In a process that is performed next after S1004, a BL control unit 119 multiplies BL light emission data determined from a BL light emission data table by a BL light emission data correction value input from a correction value decision unit 118 per divided region (S1005; correction of the BL light emission data). Consequently, the light emission brightness of each divided region is determined (set). The BL control unit 119 converts the corrected BL light emission data into PWM control data per divided region.

The image correction unit 109 multiplies the moving image input from the image analysis unit 108 by the image data correction value input from the correction value decision unit 118 (S1006; correction of the moving image). The image correction unit 109 outputs the corrected moving image to the third selector 110. In a case where both of the two images displayed together are the still images, the moving image is not input in the image analysis unit 108 and the image correction unit 109, and the process of S1006 is not performed.

Then, the system control unit 116 controls the apparatus such that the third selector 110 outputs, to the second synthesis unit 111, the moving image input from an image correction unit 109 and the still image input from the first selector 105. Furthermore, the system control unit 116 controls the apparatus such that the second synthesis unit 111 generates a synthesis image for displaying the input still image and moving image in the PoutP mode on the basis of the display layout information (S1007). The second synthesis unit 111 outputs the generated synthesis image to an image output unit 113. In the case where both of the two images displayed together are the still images, the moving image is not sent from the image correction unit 109 to the third selector 110, and the two still images are sent from the first selector 105 to the third selector 110. Then, the two still images are sent from the third selector 110 to the second synthesis unit 111, and a synthesis image for displaying these two still images in the PoutP mode is generated.

(Case where a Plurality of Images do not Include a Still Image, or Case where Interval La is Larger than Size Lb)

Processes of S510 to S513 in FIG. 10 are similar to those of S510 to S513 in FIG. 5, respectively, and therefore the description thereof will be omitted.

As described above, according to this embodiment, in a case where the still image and the moving image are displayed in the PinP mode, similarly to the first embodiment, it is possible to suppress a reduction in visibility of the still image, and to improve the contrast of the moving image. According to this embodiment, in a case where the still image and the moving image are displayed in the PoutP mode, the same light emission brightness is set with respect to a plurality of divided regions, at least a part of each of which includes the still image to be displayed, and the light emission brightness based on the characteristic value of each divided region is set with respect to the divided regions where the still image is not displayed. Consequently, in the case where the still image and the moving image are displayed in the PoutP mode, it is possible to suppress a reduction in visibility of the still image, and to improve the contrast of the moving image. According to this embodiment, in a case where a divided region displaying both the still image and the moving image does not exist, the light emission brightness based on the characteristic value of each divided region is set per divided region. In the case where the divided region displaying both the still image and the moving image does not exist, the light emission brightness of the divided regions where the still image is displayed does not change by change in the brightness of the moving image, and hence the image quality of the still image is not deteriorated. Therefore, in a case where a divided region exists where both the still image and the moving image are displayed, the light emission brightness based on the characteristic value of each divided region is set per divided region, thereby enabling improvement of the contrast of both the still image and the moving image.

Third Embodiment

A display apparatus and a control method thereof according to a third embodiment of the present invention will be hereinafter described. In each of the first and second embodiments, a configuration is described in which deterioration of the image quality of a still image is suppressed in a case where the still image and a moving image are displayed in a PinP mode, and in a case where the still image and the moving image are displayed in a PoutP mode. In this embodiment, a configuration is described in which deterioration of the image quality of still images can be suppressed also in a case where a plurality of the still images are displayed together and display positions of the still images are changed.

The overall configuration of a liquid crystal display apparatus according to this embodiment is similar to that of the first embodiment (FIG. 1), and therefore the description thereof will be omitted. The configuration and basic control of a backlight 120 according to this embodiment are also similar to those of the first embodiment, and therefore the description thereof will be omitted.

(As to Operation of Liquid Crystal Display Apparatus)

Figure 16:
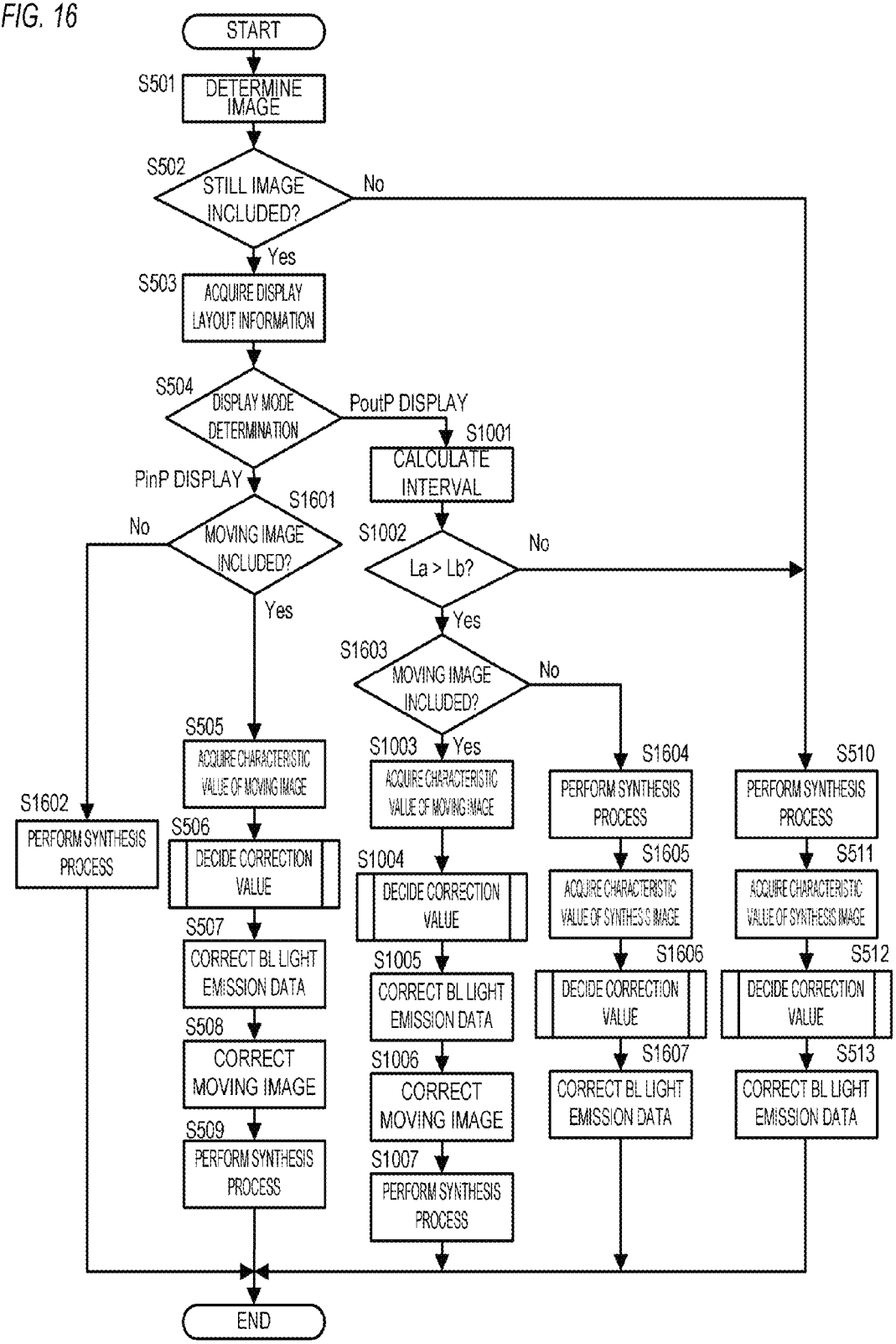
FIG. 16 is a flowchart showing an example of the operation of a liquid crystal display apparatus according to a third embodiment.

FIG. 16 is a flowchart showing an example of the operation of a liquid crystal display apparatus 101 according to this embodiment. FIG. 16 shows an example of the operation in a case where a plurality of images are displayed together. The operation in FIG. 16 starts when a system control unit 116 detects input of a power-on request, a display mode change request, a display position change request, and the like. The power-on request is input by operation of a power button 121 by a user. The display mode change request is input by operation of an operation button group 122 by a user. The display position change request for changing the display position of an image is input by operation of the operation button group 122 by the user.

Processes of S501 to S503 in FIG. 16 are similar to those of S501 to S503 in FIG. 10, respectively, and therefore the description thereof will be omitted.

In a process next to S503 in FIG. 16, a system control unit 116 determines on the basis of display layout information acquired in S503 whether a display mode is the PinP display or PoutP display (S504). When the display mode is PinP display, the process advances to S1601. When the display mode is the PoutP display, the process advances to S1001.

When the display mode is PinP display, the system control unit 116 determines from the determination results of an image determination unit 104 whether or not a plurality of images displayed together (two images input from a first image input unit 102 and a second image input unit 103) includes the moving image (S1601). When the plurality of images include the moving image, the process advances to S505. When the plurality of images do not include the moving image, the process advances to S1602.

(Case where a Plurality of Images Include Moving Image and Still Image, and are Displayed in PinP Mode)

Processes of S505 to S509 in FIG. 16 are similar to those of S505 to S509 in FIG. 10, respectively, and therefore the description thereof will be omitted.

(Case where a Plurality of Images are Only Still Image, and are Displayed in PinP Mode)

Figure 17A:
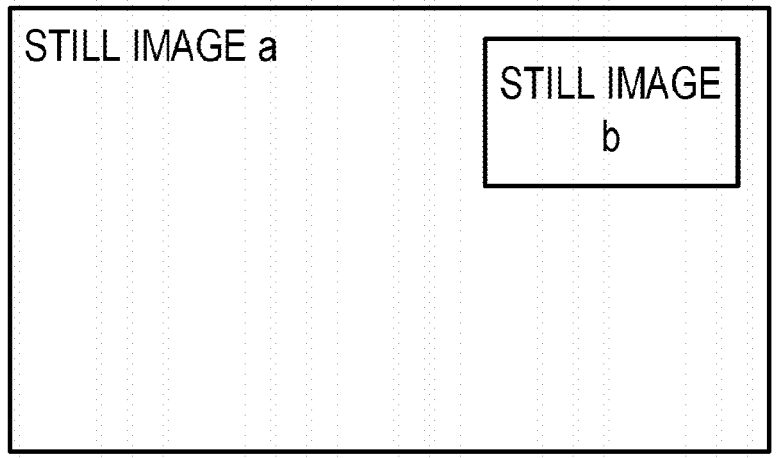
FIGS. 17A to 17C are figures each showing an example of the arrangement of still images displayed in the PinP mode.
Figure 17B:
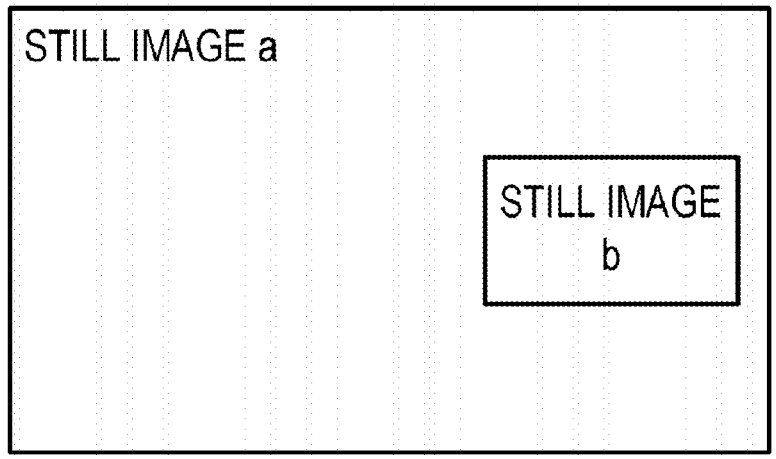
Figure 17C:
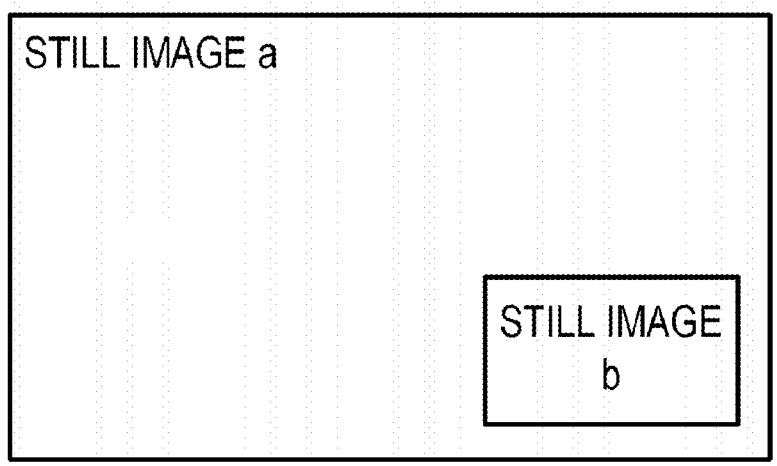

FIGS. 17A to 17C are figures each showing an example of an arrangement in a case where the two still images are displayed in the PinP mode (arrangement on a screen). In FIGS. 17A to 17C, the display positions of the still image b are different from each other. In the liquid crystal display apparatus 101 according to this embodiment, the user operates the operation button group 122, thereby enabling a change of the display position of the image. In this embodiment, the examples in which two still images are displayed at the display positions shown in FIGS. 17A to 17C in the PinP mode by such user's operation will be described. In a case where the plurality of still images are displayed in the PinP mode, when the display position of the still image is changed, flickering is generated in the display of the other still image around the still image whose display position is changed. For example, when the display position of a still image b is changed, flickering is generated in the display of a still image a around the still image b. Therefore, in this embodiment, in the case where the plurality of still images are displayed in the PinP mode, local dimming control is not performed, and the same light emission brightness is set for each divided region. Specifically, the following processes are performed in S1602. The system control unit 116 controls the apparatus such that the first selector 105 outputs, to a first synthesis unit 106, a plurality of images (two in this embodiment) input from the image determination unit 104. Furthermore, the system control unit 116 controls the apparatus such that the first synthesis unit 106 generates, on the basis of display layout information, a synthesis image for displaying the input plurality of images together. The first synthesis unit 106 outputs the generated synthesis image to a second selector 107. Then, the synthesis image is input to a liquid crystal drive unit 114 (through respective function units). A BL control unit 119 sets the same light emission brightness (standard value or value substantially equal to the standard value) for each divided region. The standard value may be a fixed value previously determined by a manufacturer, or may not be the fixed value. For example, the standard value may be a value that the user can set or change.

Hereinafter, a case where a plurality of images are displayed in a PoutP mode will be described. In a case where the display mode is PoutP display, a process of S1001 in FIG. 16 is first performed. S1001 in FIG. 16 is similar to that of S1001 in FIG. 10, and therefore the description thereof will be omitted. Next, the system control unit 116 determines whether or not a divided region exists, in which both the two images to be displayed in the PoutP mode are displayed (S1002). Specifically, the system control unit 116 determines whether or not an interval La calculated in S1001 is larger than size Lb of a single divided region. When the interval La is larger than the size Lb, it is determined that the divided region, in which both of the two images to be displayed in the PoutP mode are displayed, does not exist, the process advances to S510. When the interval La is the size Lb or less, it is determined that the divided region exists, in which both the two images to be displayed in the PoutP mode are displayed, and the process advances to S1603.

(Case where Interval La is Larger than Size Lb)

Processes of S510 to S513 in FIG. 16 are similar to those of S510 to S513 in FIG. 10, respectively, and therefore the description thereof will be omitted.

In S1603, the system control unit 116 determines from the determination results of the image determination unit 104 whether or not the plurality of images displayed together (two images input from the first image input unit 102 and the second image input unit 103) includes the moving image. When the plurality of images include a moving image, the process advances to S1003. When the plurality of images do not include the moving image, the process advances to S1604.

(Case where a Plurality of Images Include Moving Image and Still Image, and are Displayed in PoutP Mode)

Processes of S1003 to S1007 in FIG. 16 are similar to those of S1003 to S1007 in FIG. 10, respectively, and therefore the description thereof will be omitted.

(Case where a Plurality of Images are Only Still Image, and are Displayed in PoutP Display)

Figure 18A:
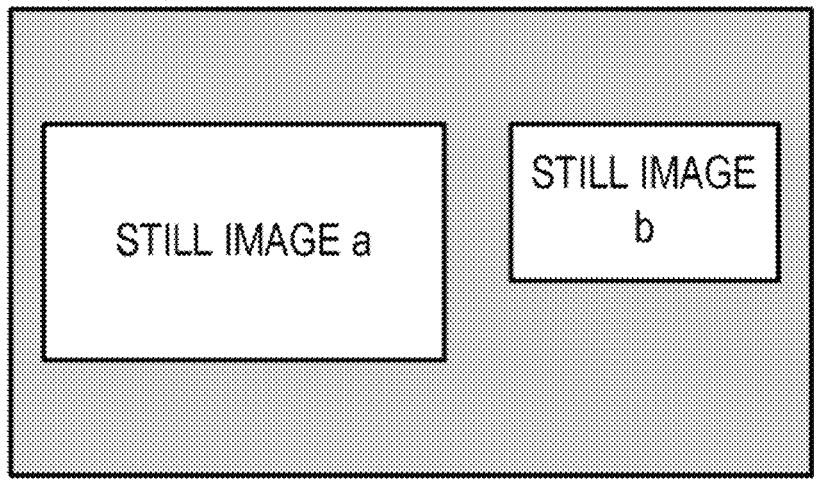
FIGS. 18A to 18C are figures each showing an example of the arrangement of the still images displayed in the PoutP mode.
Figure 18B:
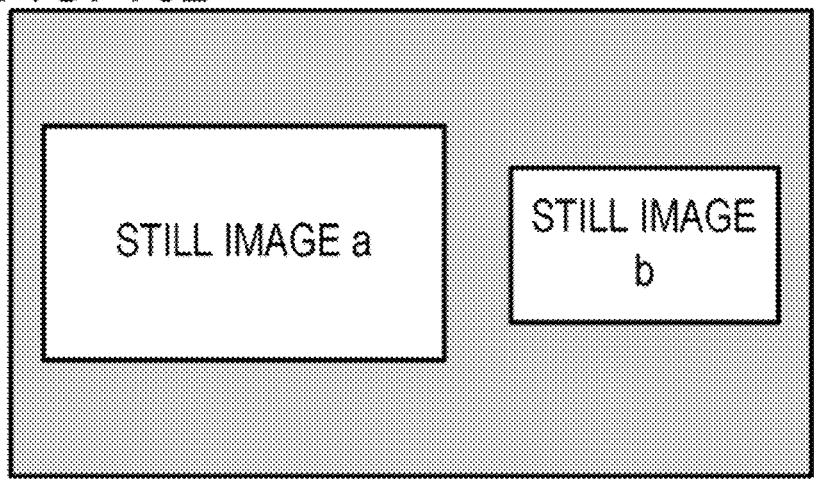
Figure 18C:
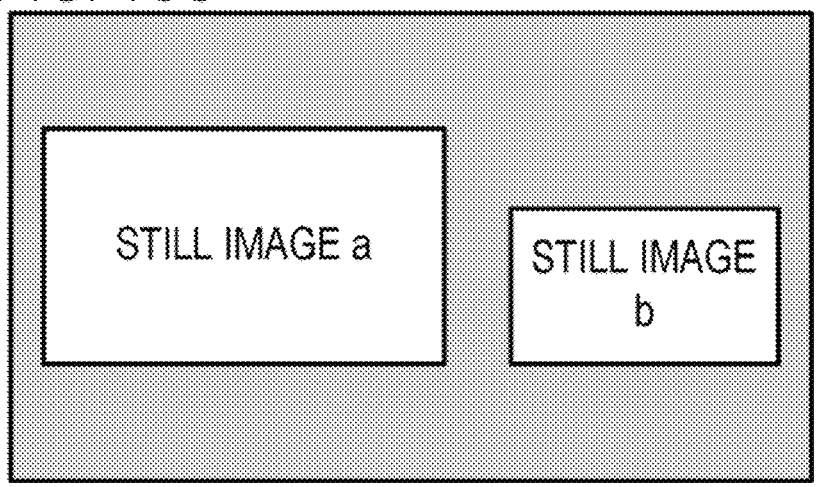

Processes of S1604 to S1607 are similar to those of S510 to S513 in FIG. 10, respectively. A specific example of the processes of S1604 to S1607 will be described with reference to FIGS. 18A to 18C, and FIG. 19. FIGS. 18A to 18C are figures each showing an example of an arrangement in a case where the two still images are displayed in the PoutP mode (arrangement on a screen). In FIGS. 18A to 18C, the display positions of the still image b are different from each other. In FIG. 19, regions shown by broken lines are the divided regions. In FIG. 19, symbol a denotes a still image region, and symbol c denotes a still image moving display region. The still image moving display region is a region where the still image b can move. In this embodiment, the still image moving display region is treated similarly to the mixed region indicated by symbol c in FIG. 7 and FIG. 12.

As described above, according to this embodiment, in a case where a still image and a moving image are displayed in the PinP mode, it is possible to suppress a reduction in visibility of the still image, and to improve the contrast of the moving image similarly to the first and second embodiments. According to this embodiment, in a case where a still image and a moving image are displayed in the PoutP mode, it is possible to suppress a reduction in visibility of the still image, and to improve the contrast of the moving image similarly to the second embodiment. According to this embodiment, in a case where a still image and a still image are displayed in the PinP mode, local dimming control is not performed, so that deterioration of the image quality of the still image can be suppressed. According to this embodiment, in a case where a still image and a still image are displayed in the PoutP mode, one of the still images moves, so that a change in the light emission brightness of the periphery of this still image can be suppressed. Consequently, the image quality of the still image that does not move does not deteriorate, and the contrast of both the still images can be improved.

In the first to third embodiments, the light emission brightness is determined on the basis of the characteristic value, thereby increasing the light emission brightness of the divided regions where a bright image is displayed, and reducing the light emission brightness of the divided regions where a dark image is displayed. However, the configuration is not limited to this. The light emission brightness of the divided regions where the dark image is displayed may be reduced without increasing the light emission brightness by determining the light emission brightness on the basis of the characteristic value. The light emission brightness of the divided regions where the bright image is displayed may be increased without reducing the light emission brightness by determining the light emission brightness on the basis of the characteristic value.

In the first to third embodiments, whether or not an image is a still image or a moving image is determined per image on the basis of the change of pixel values between a plurality of frames (a pixel value of each pixel, a representative value of the pixel values). However, the configuration is not limited to this. For example, whether or not an image is a still image or a moving image may be determined per image on the basis of the change of brightness values between the plurality of frames (a brightness value of each pixel value, a representative value of the brightness values). The representative value includes a maximum value, a minimum value, a mode, an intermediate value, an average value, and the like. When an image is input in the display apparatus, information indicating that the image is a still image or a moving image may be input together with the image. In such a case, whether the image is a still image or a moving image may be determined by using this information.

In the first to third embodiments, the display layout information is previously stored in the display apparatus. However, the display layout information may be externally input.

In the first to third embodiments, the characteristic value is an APL. However, the characteristic value is not limited to the APL. For example, the characteristic value may be a representative value of pixel values, or a representative value of brightness values. The characteristic value may be acquired by analyzing an image, or may be acquired externally.

In the first to third embodiments, the four white LEDs are used as the light source of the single divided region. However, the light source is not limited to this. For example, a single white LED may be used as the light source of the single divided region. A plurality of LEDs (a red LED, a green LED, a blue LED) that are different in emission color may be employed as the light source of the single divided region. A light-emitting device such as an organic EL device and a cold-cathode tube may be used in place of an LED.

In the first to third embodiments, it is assumed that two images are displayed together. However, the number of images to be displayed is not limited to this. The display apparatus may display three or more images together, or may display a single image. In a case where a single image is displayed, the light emission brightness may be set per divided region on the basis of the characteristic value of each divided region, regardless of whether the image is a still image or a moving image. The same light emission brightness may be set for each divided region.

In the first to third embodiments, the moving image in the mixed region is corrected. However, such correction may not be performed.

In the first to third embodiments, a standard light emission brightness (BL light emission data obtained from the BL light emission data table) is corrected, so that the final light emission brightness (final BL light emission data) is determined. The configuration is not limited to this. For example, after the light emission brightness is determined per divided region on the basis of the characteristic value of each divided region, the light emission brightness of the divided regions where the still image is at least partially displayed may be changed. The light emission brightness of the divided regions where the still image is at least partially displayed, and the light emission brightness of the divided regions other than the aforementioned divided regions may be determined by different methods.

Any method of determining the light emission brightness on the basis of the characteristic value of each divided region may be employed. For example, the light emission brightness of each divided region may be determined per divided region according to the characteristic value of the divided region. The light emission brightness of the divided region (target divided region) may be determined per divided region according to the characteristic value of the target divided region, and the characteristic value of the divided region around the target divided region.

In the second embodiment, in the case where the still image and the moving image are displayed in the PinP mode, and in the case where the still image and the moving image are displayed in the PoutP mode, deterioration of the image quality of the still image is suppressed. However, a condition for suppressing the deterioration is not limited to this. For example, the deterioration of the image quality of the still image may be suppressed by setting the light emission brightness with respect to a plurality of divided regions where the still image is at least partially displayed, only in the case where the still image and the moving image are displayed in the PoutP mode.

The display mode for displaying a plurality of images together is not limited to PinP display and PoutP display. An example of another display mode includes, for example, a display mode in which an image overlaps a part of another image.

In the second embodiment, the background image is treated as the still image, but the background image may be treated as the moving image. In such a case, the divided region where only the background image and the moving image are displayed is not the mixed region, and the divided region where the background image and the still image are displayed, the divided region where the moving image, the background image, and the still image are displayed, and the divided region where the moving image and the still image are displayed are the mixed regions. The light emission brightness based on the characteristic value of each divided region (characteristic value of the background image) may be set with respect to the divided regions where only the background image is displayed. In such a case, the background image in the mixed region is preferably corrected similarly to the moving image in the mixed region. Image correction data for correcting the background image may be determined by a method similar to the method of determining the image correction data for correcting the moving image. Specifically, the image correction data may be determined by using the difference between the BL light emission data correction value determined in S604, and the BL light emission data correction value when it is assumed that only the background image is displayed, and the background image data correction value table stored in the non-volatile memory 117. The background image data correction value table is a table (or a function) indicating the relation between the difference of the BL light emission data correction value, and the image data correction values. The background image data correction value table may be the same as the image data correction value table for correcting the moving image, or may be different from the image data correction value table for correcting the moving image.

In the first to third embodiments, local dimming (LD) control is not performed for the still image. However, the LD control may be performed for the still image. In such a case, for example, the light emission brightness of the backlight may be set on the basis of the characteristic values of the still image in the mixed region.

Even in a case where the mixed region does not exist, light of the backlight in the moving image regions sometimes leaks inside the still image regions. When such a leak occurs, flickering is generated in the still image regions due to the change of a backlight light amount in the moving image regions in the LD control. Therefore, among the moving image regions, the light emission brightness may be set for the divided regions adjacent to the still image regions on the basis of the characteristic values of the still image regions.

Figure 20:
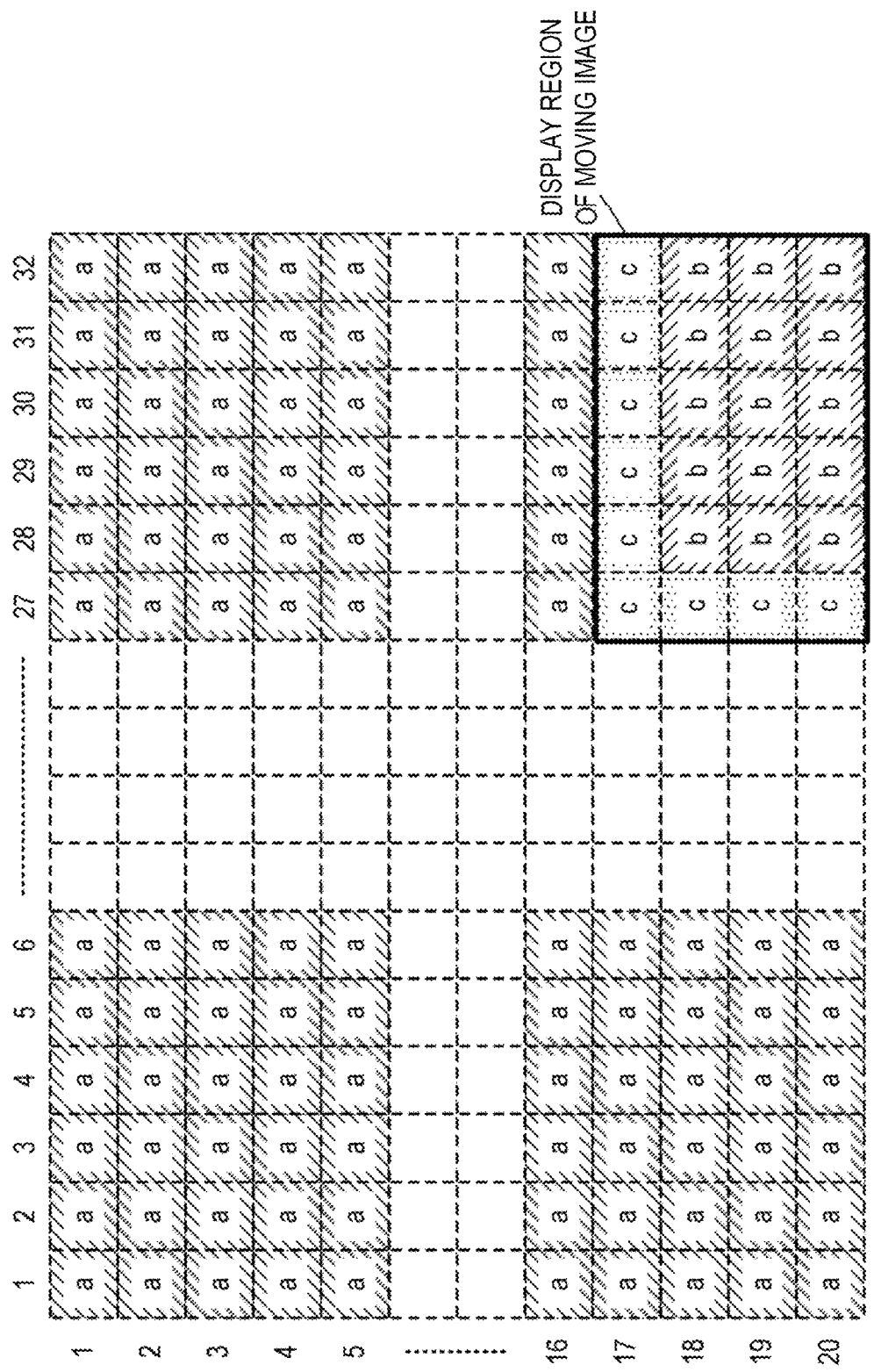
FIG. 20 is a figure showing an example of a method of setting light emission brightness according to another embodiment.

A specific example will be described with reference to FIG. 20. In FIG. 20, a symbol a denotes a still image region, symbol b denotes a moving image region, and symbol c denotes a moving image region adjacent to the still image region. In this case, the light emission brightness of the backlight is set for the regions c on the basis of the brightness of a still image. For example, when LD control is not performed for the still image regions, the light emission brightness that is the same as the light emission brightness of the still image regions is set for the regions c. On the other hand, when the LD control is performed for the still image regions, the light emission brightness based on the light emission brightness of peripheral still image regions is set for the regions c. For example, the same light emission brightness as the peripheral still image region c is set for the regions c. In a case where a plurality of peripheral still image regions exist, representative values (a maximum value, a minimum value, a mode, an intermediate value, an average value) of the light emission brightness of the plurality of still image regions are set as the light emission brightness of the regions c. In the example of FIG. 20, for five regions c on the right among six regions c located in the fourth line from the bottom, light emission brightness that is the same as that of regions a adjacent on the upper side is set. For three regions c on the lower side among four regions c located in the sixth line from the right, light emission brightness that is the same as that of regions a adjacent on the left is set. For the region c located in fourth line from the bottom and the sixth line from the right, an average value of the light emission brightness of three regions a, namely a region a adjacent on the upper side, a region a adjacent on the left, and a region a adjacent on upper left side is set as light emission brightness. The moving image region where the light emission brightness is set on the basis of the characteristic value of the still image is not limited to the moving image region adjacent to the still image region. For example, for a moving image region where a distance from the still image region is less than a predetermined value, the light emission brightness may be set on the basis of the characteristic value of the still image. For example, in FIG. 20, for regions b adjacent to the regions c, the light emission brightness may be set on the basis of the characteristic value of the still image. At this time, for a moving image region where a distance from the still image region is the predetermined value or more, the light emission brightness is set on the basis of the characteristic value of this moving image region.

When the size of the still image in the mixed region is extremely small, flickering is unlikely to be visually recognized. Therefore, a process may be switched according to the area size of the still image in the mixed region. For example, in a case where the area size of the still image in the mixed region is a predetermined area size or more, the light emission brightness may be set for the mixed region on the basis of the brightness of the still image. That is, in the case where the area size of the still image in the mixed region is the predetermined area size or more, the aforementioned process in each embodiment may be performed. In a case where the area size of the still image in the mixed region is not more than the predetermined area size, the light emission brightness may be set for the mixed region on the basis of the characteristic value of the display image in the mixed region (total characteristic value of the still image and the moving image). Specifically, in a case where the ratio of the area size of the still image in the mixed region to the total area size of the mixed region is less than 20%, the light emission brightness is set for this mixed region on the basis of the brightness of the still image. In a case where the ratio of the area size of the still image in the mixed region to the total area size of the mixed region is not more than 20%, the light emission brightness is set for this mixed region on the basis of the characteristic value of the display image in this mixed region. The aforementioned threshold value is not limited to 20%, and may be 10%, 30%, or the like. Even when the aforementioned rates are the same, easiness of the disturbance of the still image is different between a display whose pixel size per pixel is large, and a display whose pixel size per pixel is small. Therefore, the aforementioned threshold value is preferably determined on the basis of the pixel size per pixel of a display apparatus.

In the first to third embodiments, the still image and the moving image are discriminated. However, objects to be discriminated are not limited to these. For example, instead of the use of the divided region including only the moving image as a moving image region, and the use of the divided region including only the still image as a still image region, a region where the movement amount of the image is a predetermined value or more (region where the movement of an image is large) may be used as the moving image region, and a region where the movement amount of the image is not greater than the predetermined value (region where the movement of an image is small) may be used as the still image region. In a case of such a configuration, even the divided region including the moving image is treated as the still image region, when the movement of the image in the divided region is small. For example, in a case where an image includes a region of a landscape (region where movement is small), and a region of a running car (region where movement is large), the region of the landscape can be treated as the still image region, and the region of the car can be treated as the moving image region. Similar to the case where the still image and the moving image are displayed together, in the region where the movement of the image is small, visibility is reduced due to the change of the light emission brightness of the region where the movement of the image is large. When the aforementioned configuration is employed, a reduction in such visibility can be suppressed.

Fourth Embodiment

In local dimming control, in order to enhance the contrast of display image, the light emission brightness of a light source in a region (hereinafter, dark portion) where a dark image is displayed is controlled to be a low value, and the light emission brightness of the light source in a region (hereinafter, bright portion) where a bright image is displayed is controlled to be a high value. Therefore, in a case where the bright portion is adjacent to the dark portion, light leaks from a light source just below the bright portion, thereby generating halos or flickers in the dark portion. A method for solving such a problem is disclosed, for example, in Japanese Patent Application Laid-open No. 2009-282451. In the technology disclosed in Japanese Patent Application Laid-open No. 2009-282451, a change in input image data between frames is detected. Then, when abrupt change is detected, a space low pass filter (hereinafter, space LPF) is adapted to the light emission brightness of the light source in a region around the bright portion. Consequently, it is possible to enhance the light emission brightness of the light source in the dark portion around the bright portion, and suppress flicker.

However, in the aforementioned conventional technology, the light emission brightness of the light source in the dark portion around the bright portion is increased in order to suppress flicker. Therefore, in a display apparatus, to which high brightness reproducibility is required, such as a picture and waveform monitor, in a case where another display region (sub display region) exists in a display region (main display region) like PinP display, the brightness reproducibility of the main display region is sometimes degraded. The main display region is a region where an image to which high brightness reproducibility is required is displayed, and the sub display region is a region where additional information (image to which high brightness reproducibility is not required) is displayed, such as a wave form monitor. Specifically, in a case where the main display region is a dark portion, and the sub display region is a bright portion, in the aforementioned conventional technology, the space LPF is adapted for the light emission brightness of a light source in a region around the sub display region. As a result, the light emission brightness of the light source in the region around the sub display region among the main display regions is increased, and the brightness reproducibility is degraded.

Figure 21:
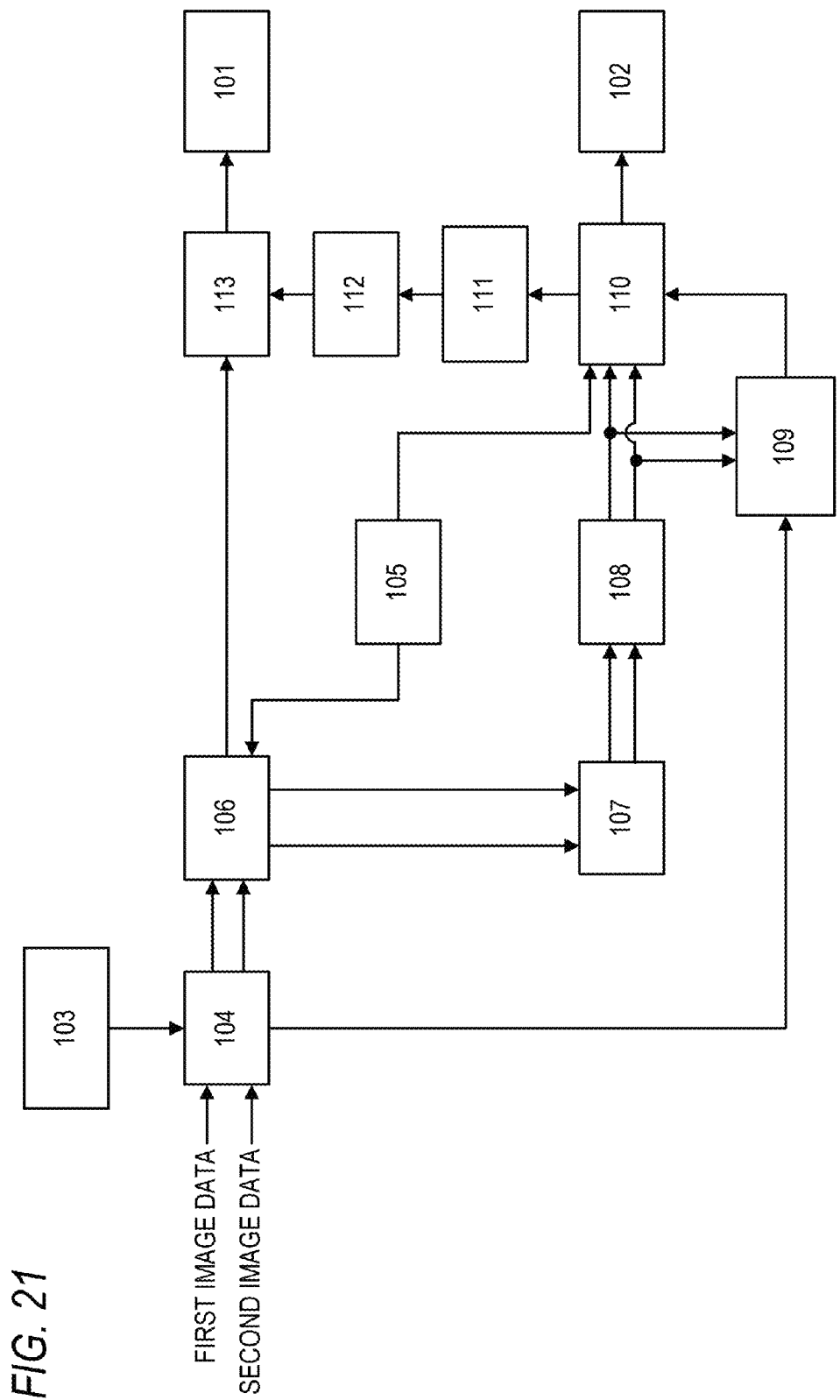
FIG. 21 is a block diagram showing an example of a function configuration of a display apparatus according to a fourth embodiment.

In the fourth embodiment, a technology capable of maintaining the brightness reproducibility of the main display region, and suppressing flicker generated in the main display region will be described. FIG. 21 is a block diagram showing an example of a function configuration of a display apparatus according to this embodiment. As shown in FIG. 21, the display apparatus according to this embodiment has a liquid crystal panel 101, a backlight 102, a layout information communication unit 103, an enlargement/reduction unit 104, a synthesis instruction unit 105, an image data synthesis unit 106, a characteristic value detection unit 107, a target brightness calculation unit 108, a target brightness comparison unit 109, a target brightness selection unit 110, a brightness estimation operation unit 111, a correction value calculation unit 112, and an image data correction unit 113.

The liquid crystal panel 101 is a display unit having a plurality of pixels each configured from sub pixels of a plurality of colors. The liquid crystal panel 101 displays an image based on image data input in the liquid crystal panel 101.

Figure 23:
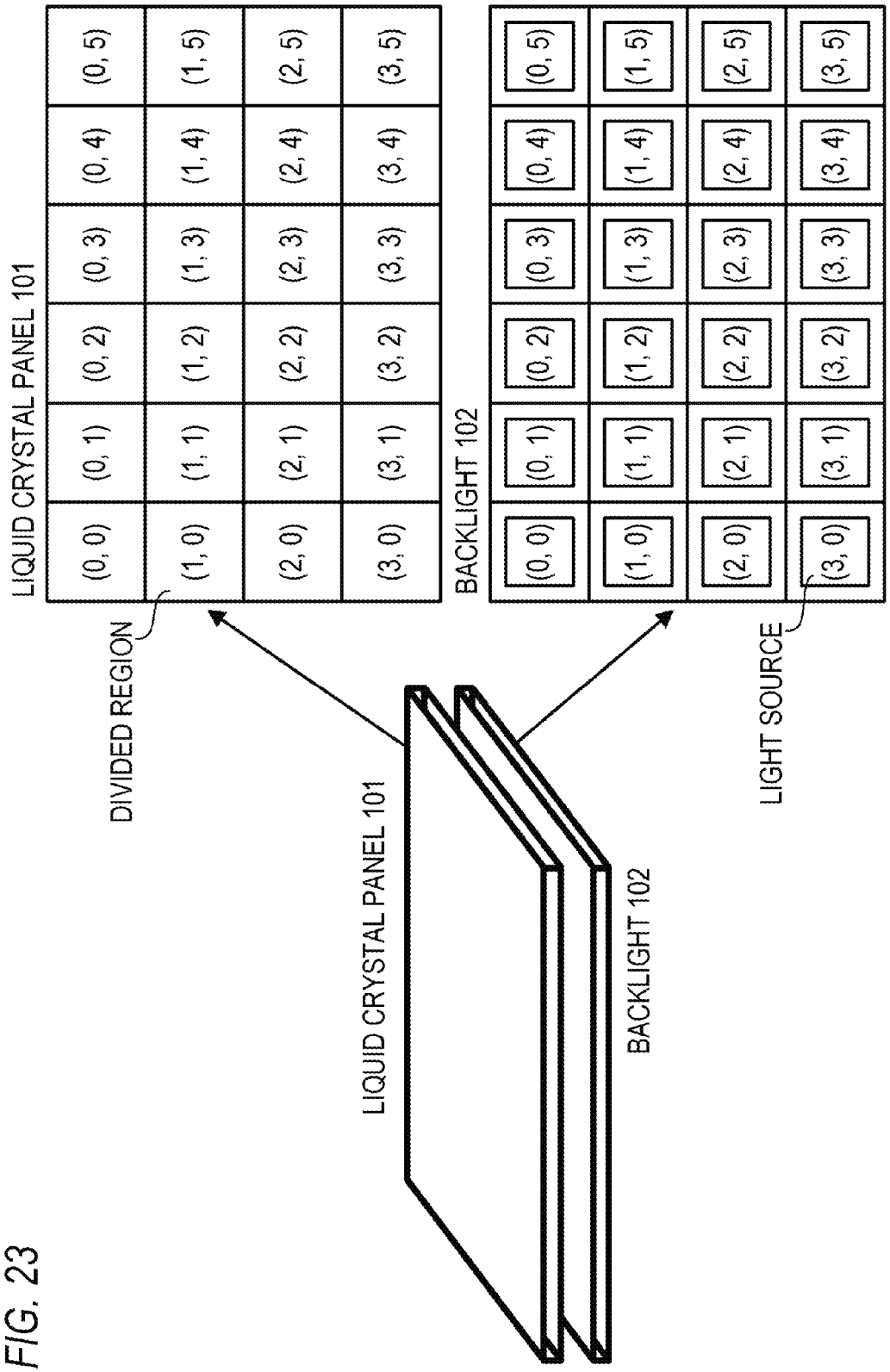
FIG. 23 is a figure showing an example of the arrangement of divided regions and light sources according to the fourth embodiment.

The backlight 102 has a plurality of light sources. Light emitted from the backlight 102 (plurality of light sources) is applied to the back surface of the liquid crystal panel 101. For example, the backlight 102 has the light source for each of divided regions obtained by dividing an irradiated region (region corresponding to a region of a screen) into x equal parts horizontally, and y equal parts vertically. The "x" and "y" each are an integer of 1 or more. In this embodiment, as shown in FIG. 23, the backlight 102 has 24 light sources corresponding to 24 divided regions obtained by the region of the screen into 6 equal parts horizontally and 4 equal parts vertically. The light emission brightness of each light source is controlled on the basis of a characteristic value that represents the brightness of an image to be displayed on a corresponding divided region. Hereinafter, a divided region corresponding to light source (m, n), in which a horizontal position is denoted by m, and a vertical position is denoted by n, is described as a divided region (m, n).

Hereinafter, the definition of the display region in this embodiment will be described with reference to FIGS. 24A and 24B. The display apparatus according to this embodiment receives a plurality of pieces of image data to display an image. Specifically, the display apparatus according to this embodiment receives first image data, and second image data to display an image. The first image data is image data to which high brightness reproducibility is required. The first image data is, for example, image data of electrophotography. FIG. 24A shows an example of display in a case where the first image data is received, and an image based on the first image data is displayed. The second image data is image data whose brightness reproducibility is lower than that of the first image data. For example, the second image data is image data that forms graphical user interface (GUI), and image data that represents captions. FIG. 24B shows an example of a display in a case where the first image data and the second image data are received, and an image based on image data, which is obtained by synthesizing both of the first image data and the second image data. Herein, the region of the screen includes regions where an image based on the first image data is displayed, and regions where an image based on the second image data is displayed. The regions where the image based on the first image data is displayed are the main display regions, the regions where the image based on the second image data is displayed are the sub display regions. Hereinafter, a divided region including the sub display region is referred to as a sub divided region, and a light source corresponding to the sub divided region is referred to as a sub light source. A divided region other than sub divided region is referred to as a main divided region, and a light source corresponding to the main divided region is referred to as a main light source. For example, in the example of FIG. 23, among the 24 divided regions, the six divided regions (2, 3), (2, 4), (2, 5), (3, 3), (3, 4), (3, 5) are the sub divided regions, and the remaining 18 divided regions are the main divided regions.

In this embodiment, an example of receiving two pieces of image data of the first image data and the second image data will be described, the number of received image data may be greater than two. In such a case, a plurality of sub display regions or a plurality of main display regions may be provided. In this embodiment, an example of receiving the image data externally will be described. However, the image data is not limited to the image data that is received externally. For example, the present invention is applicable also to an on-screen display (OSD) that performs superposition display of image data previously prepared in a display apparatus, such as image data that forms a GUI used for changing the setting of the display apparatus. Whether the received image data is the first image data or the second image data may be determined in any manner. For example, whether image data received by a reception terminal is the first image data or the second image data may be determined according to the reception terminal. Specifically, image data received by a first reception terminal may be determined as the first image data, and image data received by a second reception terminal may be determined as the second image data. Alternatively, among a plurality of regions where a plurality of images (plurality of images based on the plurality of images) are displayed, a maximum region may be determined as the main display region, and image data displayed in this main display region may be determined as the first image data.

The layout information communication unit 103 previously holds layout information that represents the display region of each received image data, and notifies the enlargement/reduction unit 104 of the layout information. The layout information is, for example, the position and the size of the display region.

The layout information may be information that represents the start point and the endpoint of the display region.

The layout information may be acquired externally. For example, the layout information may be added to image data as metadata.

The enlargement/reduction unit 104 performs enlargement/reduction process for each received image data on the basis of the layout information notified from the layout information communication unit 103. Then, the enlargement/reduction unit 104 transmits, to the image data synthesis unit 106, each image data that has been subjected to the enlargement/reduction process, and notifies the target brightness comparison unit 109 of the notified layout information. In this embodiment, the enlargement/reduction process is performed such that the size of the image coincides with the size shown in the layout information.

The synthesis instruction unit 105 notifies the image data synthesis unit 106 of a synthesis instruction according to a display setting change instruction (instruction for changing display setting) that is generated according to user's operation or the like, and notifies the target brightness selection unit 110 of a post-synthesis target brightness selection instruction.

The image data synthesis unit 106 synthesizes each image data, which has been subjected to the enlargement/reduction process by the enlargement/reduction unit 104, according to the notification of the synthesis instruction from the synthesis instruction unit 105, thereby generating synthesis image data to send the generated synthesis image data to the image data correction unit 113.

The characteristic value detection unit 107 acquires the first image data and the synthesis image data from the image data synthesis unit 106. Then, the characteristic value detection unit 107 divides the image data into image data of each divided region, and performs a process of detecting (acquiring) a characteristic value from the image data of each divided region per divided region for the first image data and the synthesis image data. Consequently, the characteristic value of the first image data before the second image data is synthesized (pre-synthesis characteristic value), and the characteristic value of the synthesis image data obtained by synthesizing the first image data and the second image data (post-synthesis characteristic value) are acquired. The characteristic value detection unit 107 notifies the target brightness calculation unit 108 of the detected characteristic values. The characteristic values each represent the brightness of an image, and is, for example, a maximum brightness value, or an average brightness value.

The target brightness calculation unit 108 calculates target brightness of each light source on the basis of the characteristic values detected by the characteristic value detection unit 107. Specifically, the target brightness of the light source corresponding to the divided region is calculated per divided region according to the characteristic value of the divided region. Hereinafter, target brightness determined according to the pre-synthesis characteristic value is described as pre-synthesis target brightness, and target brightness determined according to the post-synthesis characteristic value is described as post-synthesis target brightness.

Figure 22:
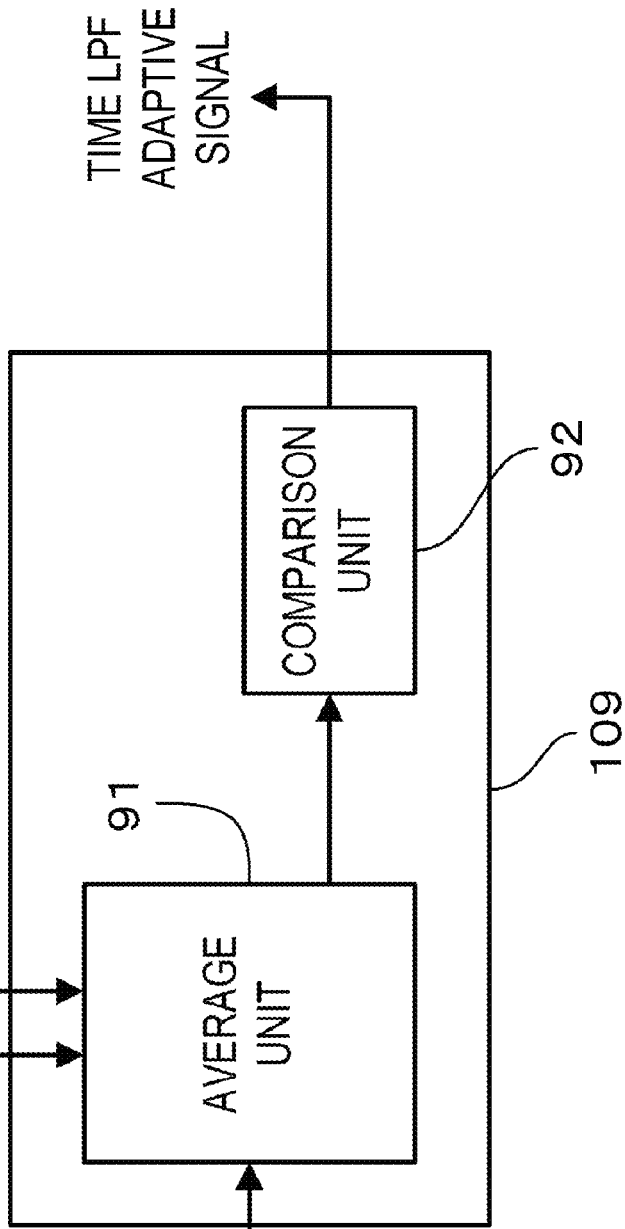
FIG. 22 is a block diagram showing an example of a function configuration of a light emission brightness comparison unit according to the fourth embodiment.

The target brightness comparison unit 109 has an average unit 91, and a comparison unit 92, as shown in FIG. 22. The average unit 91 acquires the layout information from the enlargement/reduction unit 104, and acquires the pre-synthesis target brightness, and the pre-synthesis target brightness from the target brightness calculation unit 108. The average unit 91 detects sub divided regions (divided regions where the second image data is displayed) on the basis of the layout information. Then, the average unit 91 calculates the average value of the pre-synthesis target brightness of the sub divided regions (pre-synthesis average brightness), and the average value of the post-synthesis target brightness of the sub divided regions (post-synthesis average brightness). The comparison unit 92 determines whether or not difference between the pre-synthesis average brightness and the post-synthesis average brightness calculated by the average unit 91 is larger than a threshold value. When the difference of the average brightness is larger than the threshold value, the comparison unit 92 determines that flicker is generated after synthesis, and transmits a time low pass filter (time LPF) adaptive signal to the target brightness selection unit 110. The time LPF adaptive signal is information indicating a light source or a divided region to which the LPF is applied with respect to change in time of the target brightness. In this embodiment, information indicating the sub light sources or the sub divided regions is transmitted as the time LPF adaptive signal. The threshold value may be a fixed value previously fixed, or may be an arbitrary value set by a user or the like.

The target brightness selection unit 110 selects the post-synthesis target brightness calculated by the target brightness calculation unit 108, according to the notification of the post-synthesis target brightness selection instruction from the synthesis instruction unit 105. Then, the target brightness selection unit 110 controls the light emission brightness of each light source of the backlight 102 to the selected post-synthesis target brightness, and sends the post-synthesis target brightness of each light source to the brightness estimation operation unit 111.

However, when the time LPF adaptive signal is transmitted from the target brightness comparison unit 109, the target brightness selection unit 110 applies the time LPF to the post-synthesis target brightness of the sub light sources. Then, as to the sub light sources, the light emission brightness is controlled to post time LPF target brightness, and the target brightness of the post time LPF target brightness is sent to the brightness estimation operation unit 111.

The brightness estimation operation unit 111 calculates total brightness of light given to each pixel by each light source per pixel, on the basis of the target brightness of each light source sent from the target brightness selection unit 110. For example, attenuation information that represents the correspondence relation between distances from light sources and arrival rates of light from the light sources is previously prepared. Then, brightness (partial brightness) of the light from each light source at a position of a target pixel is calculated per light source by using the attenuation information. The partial brightness is calculated, for example, by multiplying the target brightness of each light source by the arrival rate corresponding to a distance between the light source and the target pixel. Then, the partial brightness of each light source is summed up, thereby calculating the brightness (total brightness) of synthesis light of light from the plurality of light sources at the position of the target pixel.

Additionally, the brightness estimation operation unit 111 calculates, per pixel, a decreasing rate of light source brightness of the above calculated total brightness with respect to a standard value. The standard value is, for example, total brightness in a case where all the light sources emit light at predetermined light emission brightness.

The correction value calculation unit 112 calculates a correction value to a pixel value of the synthesis image data per pixel on the basis of the decreasing rate calculated by the brightness estimation operation unit 111. For example, in a case where the display brightness of each pixel (brightness on the screen) is made the same value as display brightness when the total brightness is the standard value, a reciprocal number of the decreasing rate should be made the correction value.

The image data correction unit 113 corrects synthesis image data on the basis of the correction value calculated by the correction value calculation unit 112 in order to correct the change in the display brightness with the change in the light emission brightness. Consequently, even when the light source brightness changes, the display brightness of the pixels is maintained.

Figure 25:
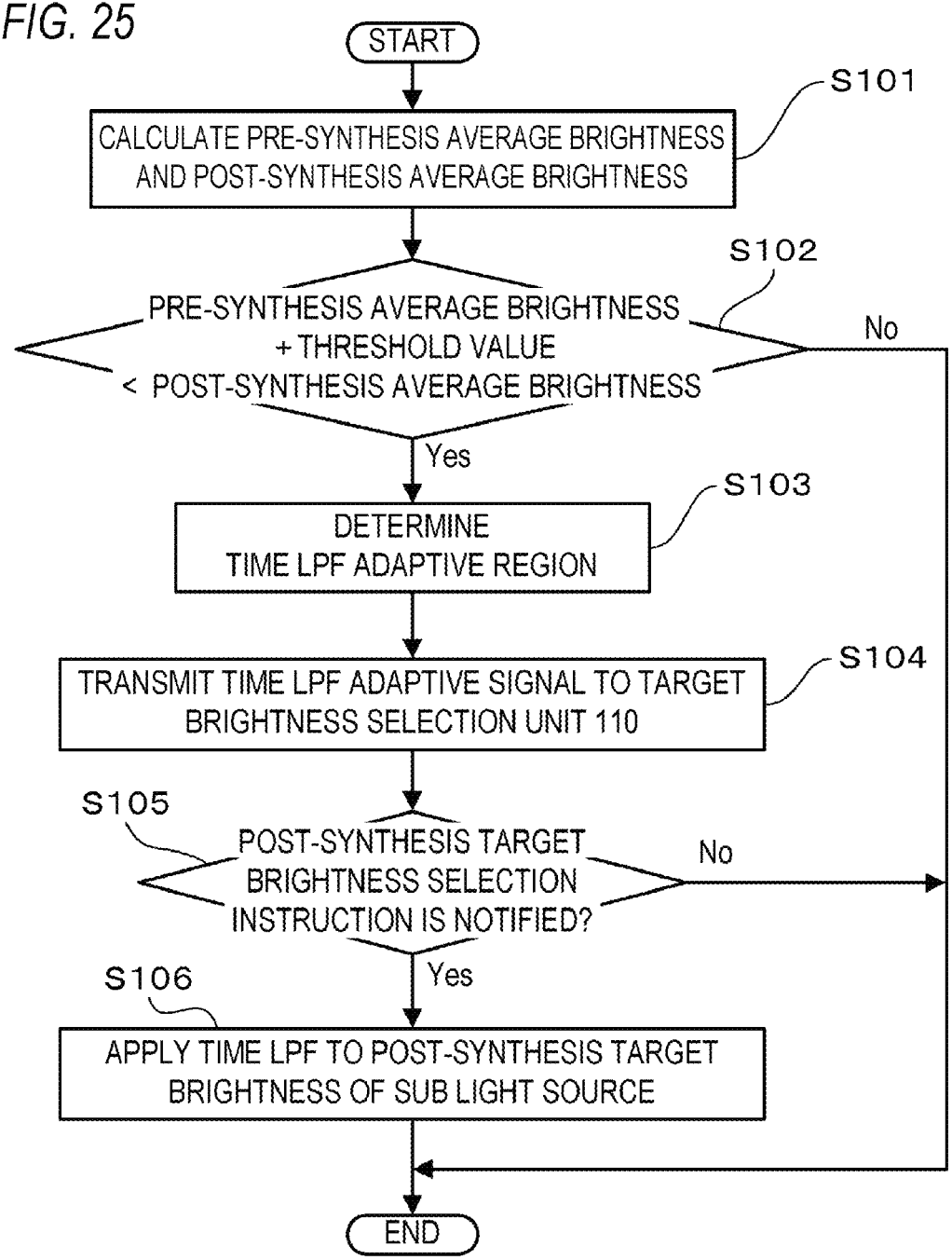
FIG. 25 is a flowchart showing an example of a process flow of the display apparatus according to the fourth embodiment.

A method of controlling the light emission brightness in a case of synthesizing a plurality of pieces of image data to display an image will be hereinafter described in detail with reference to FIG. 25. FIG. 25 is a flowchart showing an example of a method of controlling the light emission brightness in a case of displaying synthesis image data. A process in a case of receiving and displaying a single image data is not a feature portion of the present invention, and therefore, the detailed description thereof will be omitted. In the process in the case of receiving and displaying a single image data, for example, a characteristic value of each divided region from the received image data is acquired. Then, the light emission brightness of a light source corresponding to each divided region is controlled per divided region according to the characteristic value acquired with respect to the divided region. A correct process in accordance with control of the light emission brightness (process of correcting the change in display brightness with the change in the light emission brightness) is performed for the received image data.

First, the target brightness comparison unit 109 calculates an average value of pre-synthesis target brightness of the sub divided regions (pre-synthesis average brightness), and an average value of post-synthesis target brightness of the sub divided regions (post-synthesis average brightness) (S101).

Next, the target brightness comparison unit 109 determines whether or not the post-synthesis average brightness is higher than the pre-synthesis average brightness, and difference between the post-synthesis average brightness and the pre-synthesis average brightness is larger than a threshold value (S102).

When the post-synthesis average brightness is higher than the pre-synthesis average brightness, and the difference between the post-synthesis average brightness and the pre-synthesis average brightness is larger than the threshold value (S102: Yes), the process advances to S103.

In a case other than the above case (S102: No), the process is terminated. Then, the target brightness selection unit 110 selects the post-synthesis target brightness, and controls the light emission brightness of each light source to the post-synthesis target brightness. Additionally, the correction process in accordance with control of the light emission brightness is performed for synthesis image data.

In S103, the target brightness comparison unit 109 determines that the time LPF is applied to the target brightness of the sub divided regions (sub light sources).

Next, the target brightness comparison unit 109 transmits a time LPF adaptive signal representing the sub divided regions to the target brightness selection unit 110 (S104).

The target brightness selection unit 110 determines whether or not the post-synthesis target brightness selection instruction is notified from the synthesis instruction unit 105, and the time LPF adaptive signal is notified from the target brightness comparison unit 109 (S105).

When the target brightness selection unit 110 determines that the post-synthesis target brightness selection instruction is notified from the synthesis instruction unit 105, and the time LPF adaptive signal is notified from the target brightness comparison unit 109 (S105: Yes), the process advances to S106.

In a case other than the above case (S105: No), the process is terminated. Then, the target brightness selection unit 110 selects the post-synthesis target brightness, and controls the light emission brightness of each light source to the post-synthesis target brightness. Additionally, the correction process in accordance with control of the light emission brightness is performed for the synthesis image data.

In S106, the target brightness selection unit 110 selects the post-synthesis target brightness, and applies the time LPF to the post-synthesis target brightness of the sub light sources designated by the time LPF adaptive signal. Then, the light emission brightness of the sub light sources is controlled to target brightness after time LPF application, the light emission brightness of the main light source is controlled to the post-synthesis target brightness. Consequently, rapid change in the target brightness (light emission brightness) of the sub light sources after synthesis is suppressed. Additionally, the correction process in accordance with control of the light emission brightness is performed for the synthesis image data.

Figure 26A:
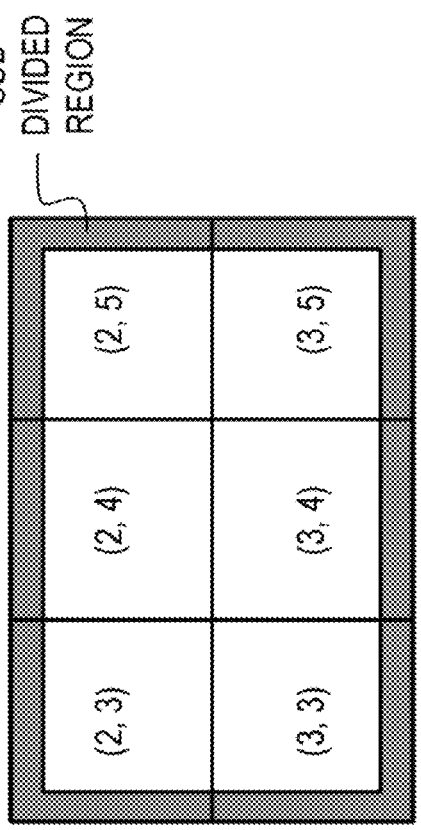
FIGS. 26A to 26D are figures showing an example of an image and target brightness according to the fourth embodiment.
Figure 26B:
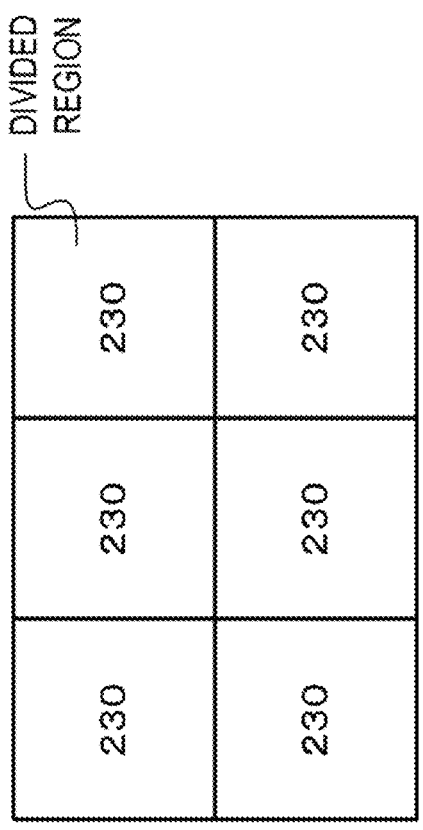
Figure 26C:
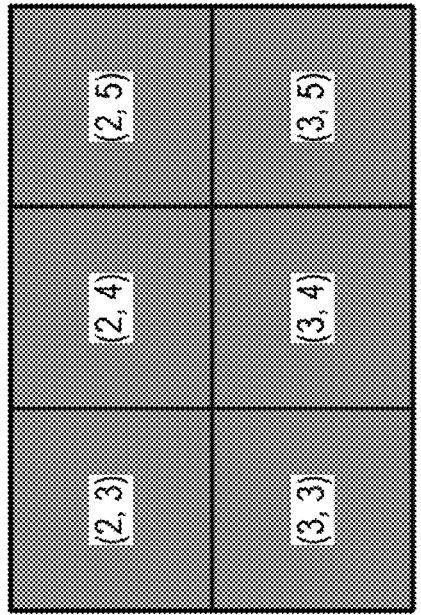
Figure 26D:
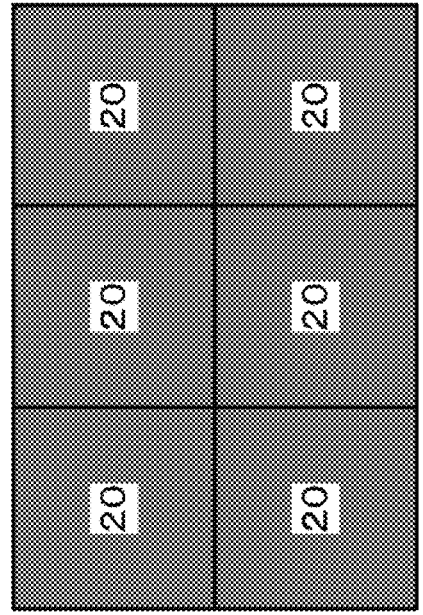

FIG. 26A shows an example of image (pre-synthesis image) based on the first image data. FIG. 26B is a figure showing an example of an image (post-synthesis image) based on the synthesis image data, and shows an image obtained by superimposing the image based on the second image data on the pre-synthesis image of FIG. 26A. In FIG. 26B, regions shown by white are regions of the image based on the second image data (sub display regions). FIG. 26C shows pre-synthesis target brightness determined on the basis of the pre-synthesis image shown in FIG. 26A, and FIG. 26D shows post-synthesis target brightness determined on the basis of the post-synthesis shown in FIG. 26B. Only a part of the divided regions are shown in FIGS. 26A to 26D, and other divided regions are omitted.

In a case where the image based on the synthesis image data is the image shown in FIG. 26B, each of six divided regions (2, 3), (2, 4), (2, 5), (3, 3), (3, 4), (3, 5) is the sub divided region. Therefore, the pre-synthesis average brightness is 20 from FIG. 26C, and the post-synthesis average brightness is 230 from FIG. 26D. Then, difference between the pre-synthesis average brightness and the post-synthesis average brightness is 210.

Herein, when a threshold value that compares with the difference of the average brightness is 100, in the example of FIGS. 26A to 26D, the difference of the average brightness, i.e., 210 is larger than a threshold value, i.e., 100, and therefore it is determined that flickers are generated. Then, each of the above six sub divided regions (2, 3), (2, 4), (2, 5), (3, 3), (3, 4), (3, 5) is set as an region to which the time LPF is applied.

Thereafter, the time LPF is applied to the post-synthesis target brightness of the sub light sources, and light emission brightness of each light emission unit is controlled.

FIG. 27 is a figure showing the transition of the light emission brightness of the sub light source (2, 3) when the image display is switched from the image shown in FIG. 26A to the image shown in FIG. 26B. In a conventional method, as shown in broken lines of a graph in FIG. 27, the light emission brightness of the sub light source rapidly rises when the display is switched, and flicker is perceived in the sub divided region (a part, included in the sub divided region, of the main display region). In this embodiment, the time LPF is applied to the light emission brightness (target brightness) of the sub light source, and therefore rising of the light emission brightness of the sub light source after synthesis becomes slow as shown in a solid line of the graph in FIG. 27, and it is possible to suppress flicker in the sub divided region.

As described above, according to this embodiment, when the difference between the pre-synthesis average brightness and the post-synthesis average brightness is larger than a threshold value, the time LPF is applied to the light emission brightness of the sub light sources. Consequently, it is possible to suppress flicker in the main display region. According to this embodiment, the light emission brightness of the main light sources is controlled according to the post-synthesis characteristic values, and therefore it is possible to suppress a reduction in the brightness reproducibility of the main display regions.

Fifth Embodiment

Hereinafter, a display apparatus according to a fifth embodiment of the present invention will be described. The lower the brightness of image data displayed in main display regions is, the greater an influence of light from light sources in sub display regions on the display brightness of the main display regions. Therefore, in this embodiment, it is determined whether or not the image data displayed in the main display regions is a dark image, and when it is determined that the image data displayed in the main display regions is a dark image, time LPF is performed similarly to the fourth embodiment.

The overall configuration of the liquid crystal display apparatus according to this embodiment is similar to that of the fourth embodiment, and therefore the description thereof will be omitted. FIG. 28 is a block diagram showing an example of a function configuration of a target brightness comparison unit 109 in the display apparatus according to this embodiment. The average unit 91 has the same function as the fourth embodiment. A limit unit 93 previously holds a threshold value of pre-synthesis average brightness (dark portion determination threshold value) as a threshold value for determining whether or not the image data displayed in the main display regions is the dark image. Then, the limit unit 93 outputs the dark portion determination threshold value to a comparison unit 94. The comparison unit 94 has the same function of the comparison unit 92 of the fourth embodiment. Additionally, the comparison unit 94 compares the pre-synthesis average brightness with the dark portion determination threshold value, and determines whether or not the image data displayed in the main display regions is the dark image. In this embodiment, the lower the brightness of the image data, the lower the target brightness that is calculated. Then, when the pre-synthesis average brightness is the dark portion determination threshold value or less, the comparison unit 94 determines whether or not the image data displayed in the main display regions is the dark image. When it is determined that the image data displayed in the main display regions is the dark image, the time LPF is performed similarly to the fourth embodiment.

Figure 29:
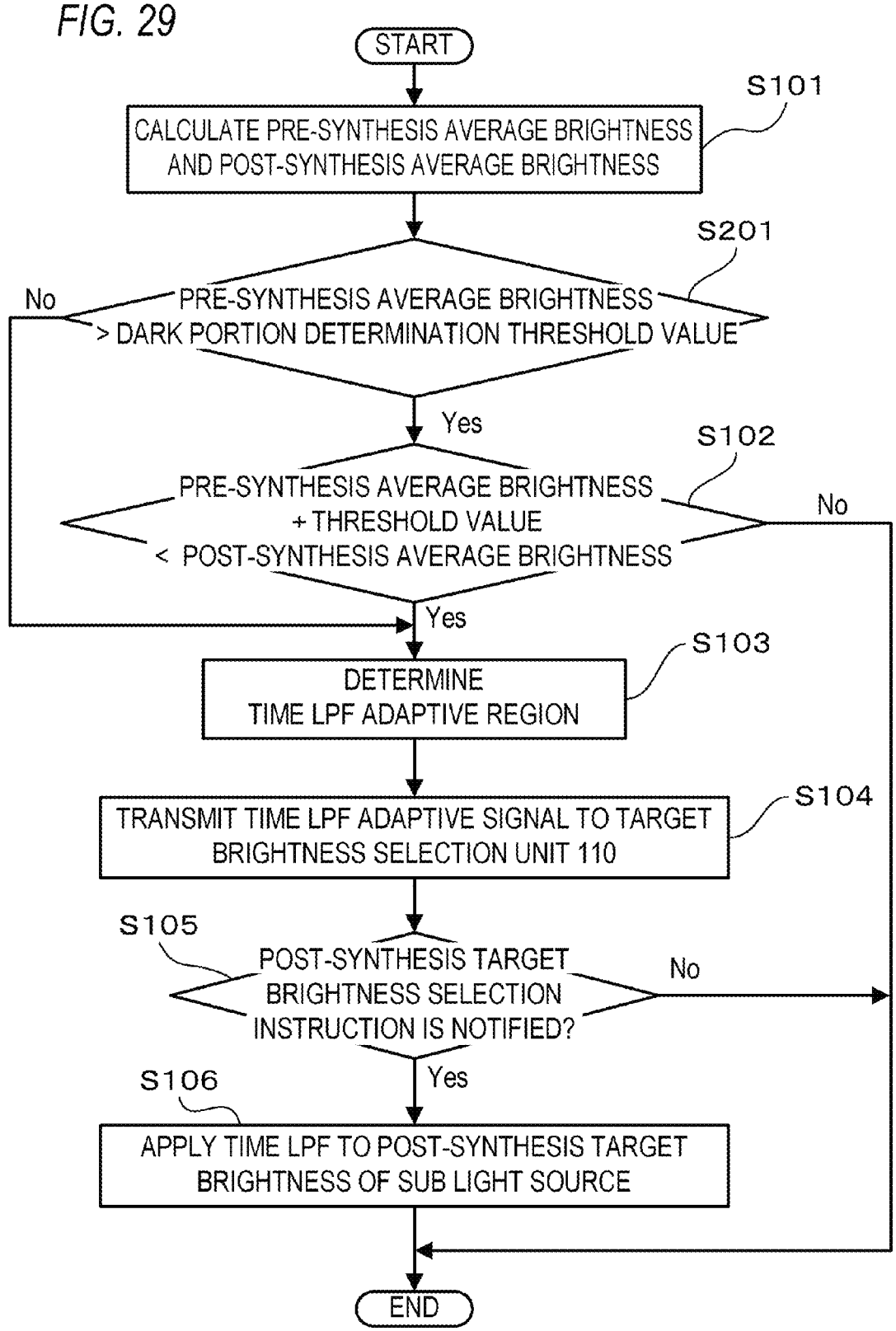
FIG. 29 is a flowchart showing an example of a process flow of the display apparatus according to the fifth embodiment.

A method of controlling light emission brightness in a case of synthesizing a plurality of pieces of image data to display will be hereinafter described in detail with reference to FIG. 29. The same processes as those of the fourth embodiment (FIG. 25) are denoted by the same symbols, and the description thereof will be omitted.

In this embodiment, in a process next to S101, the comparison unit 94 compares the pre-synthesis average brightness with the dark portion determination threshold value (S201).

When the pre-synthesis average brightness is the dark portion determination threshold value or less (S201: No), the process advances to S103. That is, the comparison unit 94 determines that the sub divided regions are determined as time LPF adaptive regions without comparing the pre-synthesis average brightness with the post-synthesis average brightness.

When the pre-synthesis average brightness is larger than the dark portion determination threshold value (S201: Yes), the process advances to S102.

Other processes are the same as those of the fourth embodiment.

As described above, according to this embodiment, it is determined whether or not the image data displayed in the main display regions is a dark image, and when it is determined that the image data displayed in the main display regions is the dark image, time LPF is performed. Consequently, flicker in the main display regions can be more reliably suppressed compared to the fourth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-212399, filed on Sep. 26, 2012, and Japanese Patent Application No. 2013-156709, filed on Jul. 29, 2013, which are hereby incorporated by reference herein in their entirety.

What is claimed is:

1. A display apparatus comprising:
    a display unit configured to display an image on a screen;
    a light emission unit configured to individually control light emission for each of a plurality of divided regions that configure the screen;
    an acquisition unit configured to acquire a characteristic value of an image displayed on each of the plurality of divided regions; and
    a control unit configured to control the light emission of the light emission unit,
    such that:
    in a still image region, in which only a still image is displayed, among the plurality of divided regions, light is emitted at a first brightness based on a characteristic value of the still image displayed in the still image region;
    in a moving image region, in which only a moving image is displayed, among the plurality of divided regions, light is emitted at a second brightness based on a characteristic value of the moving image displayed in the moving image region; and
    in a mixed region, in which both of a moving image and a still image are displayed, among the plurality of divided regions, light is emitted at a third brightness based on a characteristic value of the still image displayed in the mixed region, wherein the third brightness is not based on a characteristic of the moving image displayed in the mixed region.

2. The display apparatus according to claim 1, wherein in a case where the area size of the still image displayed in the mixed region is equal to or more than a predetermined area size, the control unit controls the light emission of the light emission unit such that light is emitted in the mixed region at the third brightness based on the characteristic value of the still image displayed in the mixed region.

3. The display apparatus according to claim 1, further comprising
    a correction unit configured to correct the moving image displayed in the mixed region such that the brightness on the screen of the moving image displayed in the mixed region does not change between a case where the light emission unit emits light at a brightness based on a characteristic value acquired by the acquisition unit, and a case where the light emission unit emits light at the third brightness determined by the control unit.

4. The display apparatus according to claim 1, wherein a moving image and a still image are displayed together in a picture-in-picture mode or a picture-out-picture mode.

5. The display apparatus according to claim 1, further comprising a determine unit configured to determine whether each of the plurality of divided regions is the still image region, the moving image region, or the mixed region based on the image displayed on each of the plurality of divided regions.

6. The display apparatus according to claim 1, further comprising:
an input unit configured to input a plurality of images; and
a synthesis unit configured to synthesize a plurality of images based on the plurality of images input by the input unit, and generating a synthesis image for displaying the plurality of images together.

7. The display apparatus according to claim 1, wherein the display unit displays two images together in a picture-in-picture mode or a picture-out-picture mode,
wherein the control unit is configured to acquire display layout information indicating whether the layout of the images on the screen is in a picture-in-picture layout or in a picture-out-picture layout,
wherein the control unit determines whether the display unit is operating in the picture-in-picture mode or the picture-out-picture mode in accordance with the acquired display layout information,
wherein when the control unit determines that the display unit is operating in a picture-in-picture mode, the control unit then determines whether the mixed region exists, and if not, the control unit performs synthesis processing on the two images,
wherein when the control unit determines that the display unit is operating in a picture-out-picture mode, the control unit calculates an interval between the two images on the basis of display layout information and determines whether the interval is larger than the size of a single divided region in which at least two input images are to be displayed,
wherein when the control unit determines that the interval is larger than the size of the single divided region, the control unit determines that the single divided region in which both of the two images are to be displayed in picture-out-picture mode does not exist and performs synthesis processing on the input images to display the two images and control the brightness of the plurality of divided regions, and
wherein when the control unit determines that the interval is equal to or smaller than the size of the single divided region, said control unit determines that the single divided region exists, and determines whether a moving image is included in the single divided region, and if not, said control unit performs synthesis processing on the input images.

8. A display apparatus comprising:
a display unit configured to display an image on a screen;
a light emission unit configured to individually control light emission for each of a plurality of divided regions that configure the screen;
an acquisition unit configured to acquire a characteristic value of an image displayed on each of the plurality of divided regions; and
a control unit configured to control the light emission of the light emission unit,
such that:
in a still image region, in which only a still image is displayed, among the plurality of divided regions, light is emitted at a first brightness based on a characteristic value of the still image displayed in the still image region;
in a first divided region, which is adjacent to the still image region, among a plurality of divided regions in which a moving image is displayed, light is emitted at the first brightness; and
in a second divided region, which is not adjacent to the still image region, among the plurality of divided regions in which the moving image is displayed, light is emitted at a second brightness based on a characteristic value of the moving image displayed in the second divided region.

9. The display apparatus according to claim 8, further comprising a correction unit configured to correct the moving image displayed in the second divided region, such that the brightness on the screen of the moving image displayed in the mixed region does not change between a case where the light emission unit emits light at a brightness based on a characteristic value acquired by the acquisition unit, and a case where the light emission unit emits light at a brightness determined by the control unit.

10. The display apparatus according to claim 8, wherein a moving image and a still image are displayed together in a picture-in-picture mode or a picture-out-picture mode.

11. The display apparatus according to claim 8, further comprising a determine unit configured to determine, when a plurality of images are displayed together whether each of the plurality of images is the still image or the moving image based on the image displayed on each of the plurality of divided regions.

12. The display apparatus according to claim 8, further comprising
an input unit configured to input a plurality of images; and
a synthesis unit configured to synthesize a plurality of images based on the plurality of images input by the input unit, and generating a synthesis image for displaying the plurality of images together.

13. The display apparatus according to claim 8, wherein the display unit displays two images together in a picture-in-picture mode or a picture-out-picture mode,
wherein the control unit is configured to acquire display layout information indicating whether the layout of the images on the screen is in a picture-in-picture layout or in a picture-out-picture layout,
wherein the control unit determines whether the display unit is operating in the picture-in-picture mode or the picture-out-picture mode in accordance with the acquired display layout information,
wherein when the control unit determines that the display unit is operating in a picture-in-picture mode, the control unit then determines whether the mixed region exists, and if not, the control unit performs synthesis processing on the two images,
wherein when the control unit determines that the display unit is operating in a picture-out-picture mode, the control unit calculates an interval between the two images on the basis of display layout information and determines whether the interval is larger than the size of a single divided region in which at least two input images are to be displayed,
wherein when the control unit determines that the interval is larger than the size of the single divided region, the control unit determines that the single divided region in which both of the two images are to be displayed in picture-out-picture mode does not exist and performs synthesis processing on the input images to display the two images and control the brightness of the plurality of divided regions, and wherein when the control unit determines that the interval is equal to or smaller than the size of the single divided region, said control unit determines that the single divided region exists, and determines whether a moving image is included in the single divided region, and if not, said control unit performs synthesis processing on the input images.

14. A display apparatus comprising:

a display unit configured to display an image on a screen;

a light emission unit configured to individually control light emission for each of a plurality of divided regions that configure the screen;

an acquisition unit configured to acquire a characteristic value of an image displayed on each of the plurality of divided regions; and a control unit configured to control the light emission of the light emission unit, such that:

in a moving image region, in which only a moving image is displayed, among the plurality of divided regions, light is emitted at a first brightness based on a characteristic value of the moving image displayed in the moving image region; and in a still image region in which only a still image is displayed, and in a mixed region in which both of a moving image and a still image are displayed, light is emitted at a second brightness, wherein the second brightness is a predetermined brightness which is a value designated by a user.

* * * * *